United States Patent
Tsao

(10) Patent No.: US 8,103,278 B2
(45) Date of Patent: Jan. 24, 2012

(54) METHOD AND SYSTEM FOR MANAGING IDLE MODE OF A MOBILE NODE WITH MULTIPLE INTERFACES

(75) Inventor: Shiao-Li Tsao, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 841 days.

(21) Appl. No.: 12/060,306

(22) Filed: Apr. 1, 2008

(65) Prior Publication Data
US 2009/0245150 A1 Oct. 1, 2009

(51) Int. Cl.
*H04W 36/00* (2009.01)

(52) U.S. Cl. ...... 455/442; 455/432.1; 455/434; 455/449; 370/331; 370/311; 370/395.52; 370/360

(58) Field of Classification Search ............ 370/331, 370/311, 395.2, 395.52, 360; 455/442, 432.1, 455/434, 449
See application file for complete search history.

(56) References Cited

U.S. PATENT DOCUMENTS

| | | | |
|---|---|---|---|
| 6,014,564 A * | 1/2000 | Donis et al. ............ | 455/436 |
| 6,711,146 B2 | 3/2004 | Yegoshin | |
| 7,058,059 B1 * | 6/2006 | Henry et al. ............ | 370/395.1 |
| 7,116,655 B2 | 10/2006 | Yegoshin | |
| 7,200,397 B1 | 4/2007 | Jones et al. | |
| 2002/0085516 A1 | 7/2002 | Bridgelall | |
| 2002/0147008 A1 | 10/2002 | Kallio | |
| 2003/0133421 A1 | 7/2003 | Sundar et al. | |
| 2003/0134636 A1 | 7/2003 | Sundar et al. | |
| 2003/0139180 A1 | 7/2003 | McIntosh et al. | |
| 2004/0014474 A1 | 1/2004 | Kanada | |
| 2004/0044887 A1 | 3/2004 | Park et al. | |
| 2005/0063350 A1 * | 3/2005 | Choudhury et al. ........ | 370/338 |
| 2007/0047490 A1 * | 3/2007 | Haverinen et al. ........ | 370/331 |

OTHER PUBLICATIONS

"Energy-Conserving Always-On Schemes for a Mobile Node with Multiple Interfaces in All-IP Network" Shiao-Li Tsao, et al.; !8th Annual IEEE International Symposium on Personal, Indoor and Mobile Radio Communications (PIMRC '07); 2006.
"Power-Efficient Interface Selection Scheme Using Paging of WWAN for WLAN in Heterogeneous Wireless Networks" SuKyoung Lee, et al., IEEE International Conference on Communications; Jun. 2006.
"IP Telephony GSM Interworking" Jussi Lemilainen, et al., IEEE Global Telecommunications Conference, vol. 5, 1999; pp. 2709-2713 vol. 5.
"PIANO: A Power Saving Strategy for Cellular/VoWLAN Dual-Mode Mobiles" Shiao-Li Tsao, et al., Wireless Network 2006.

* cited by examiner

*Primary Examiner* — Nimesh Patel
(74) *Attorney, Agent, or Firm* — Thomas|Kayden

(57) ABSTRACT

A method for controlling a first interface and a second interface installed on a mobile node is provided, wherein the mobile node communicates with a first access network (AN) through the first interface and communicates with a second AN through the second interface. The method comprises following steps. A first IP address is acquired through the first interface and the first AN for accessing a service network (SN). A second IP address is acquired through the second interface and the second AN for accessing the SN. The first interface is then selected as an awake interface. The second bridging node is directed to create and cache binding information indicating a binding of the second IP address to the first IP address. The second interface is turned off after the binding information is successfully created and cached on the second bridging node.

17 Claims, 23 Drawing Sheets

METHOD AND SYSTEM FOR MANAGING IDLE MODE OF A MOBILE NODE WITH MULTIPLE INTERFACES

BACKGROUND OF THE INVENTION

1. Field of the Invention

The invention relates to communication methods and systems, and more precisely, to methods and systems for communicating with a mobile node with multiple interfaces in a heterogeneous radio network.

2. Description of the Related Art

In recent years, mobile nodes (MN) with multiple wireless interfaces operated in heterogeneous overlay wireless networks have become increasingly popular. In a heterogeneous overlay wireless network, an MN can activate multiple interfaces simultaneously to gain permanent and ubiquitous access to the Internet, and to improve connectivity, reliability, and throughput following access to the Internet. In this scenario, an MN may have multiple unique IP addresses in an all-IP network, such as an IPv6 network. To allow correspondent nodes (CNs) to always be able to connect to an MN through any MN's IP address, the MN must keep its interfaces active to avoid packet loss.

For an MN, especially a battery-operated device with multiple wireless interfaces, power consumption is one of the critical issues. One possible solution for conserving power is to set interfaces to power-saving modes when no packets are to be sent or received. This solution, however, forces power consumption of an MN with multiple interfaces to increase substantially, even when interfaces are idle.

Alternatively, when no packets are to be sent or received, an MN can turn off the wireless interfaces completely; however, packets sent to the IP addresses associated with these turned-off interfaces of the MN will be lost.

BRIEF SUMMARY OF THE INVENTION

An embodiment of the invention provides a method for controlling a first interface and a second interface installed on a mobile node, wherein the mobile node communicates with a first access network (AN) through the first interface and communicates with a second AN through the second interface. The method comprises acquiring a first IP address through the first interface and the first AN for accessing a service network (SN), acquiring a second IP address through the second interface and the second AN for accessing the SN, selecting the first interface as an awake interface, directing the second bridging node to create and cache binding information indicating a binding of the second IP address to the first IP address, and turning off the second interface after the binding information is successfully created and cached on the second bridging node.

An embodiment of the invention further provides a system for managing at least two interfaces, comprising a first interface, a second interface and a processing unit. The first interface is capable of communicating with a first AN. The second interface is capable of communicating with a second AN. The processing unit acquires a first IP address assigning by a first bridging node through the first interface and the first AN for accessing a SN, acquires a second IP address assigned by a second bridging node through the second interface and the second AN, acquires a third IP address assigned by the first bridging node through the second interface for accessing the SN, selects the first interface as an awake interface, directs the first bridging node to create and cache binding information indicating a binding between the third IP address and the first IP address, and turns off the second interface after the binding information is successfully created and cached on the first bridging node.

An embodiment of the invention further provides a system for managing at least two interfaces, comprising a first interface, a second interface and a processing unit. The first interface is capable of communicating with a first AN. The second interface is capable of communicating with a second AN. The processing unit acquires a first IP address assigned by a first bridging node through the first interface and the first AN for accessing a SN, acquires a second IP address assigned by a second bridging node through the second interface and the second AN for accessing the SN, selects the first interface as an awake interface, directs the second bridging node to create and cache binding information indicating a binding between the second IP address and the first IP address, and turns off the second interface after the binding information is successfully created and cached on the second bridging node.

An embodiment of the invention further provides a method for controlling a first interface and a second interface installed on a mobile node, wherein the mobile node communicates with a first AN through the first interface and communicates with a second AN through the second interface. The method comprises turning off the second interface, determining whether the mobile node is potentially moved out of an available coverage of the second AN according to signals received via the first interface, and if so, turning on the second interface, discovering a third AN via the second interface, attaching to the third AN when discovered, and turning off the second interface.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is now described with reference to FIGS. 1 through 19 which generally relate to methods for communicating with a mobile node (MN) with dual interfaces each associated with an access network (AN). In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

The embodiments of the invention provide novel energy-conserving always-on schemes for an MN with multiple interfaces in an all-IP network.

Embodiments for Generic Communication System

Figure 1:
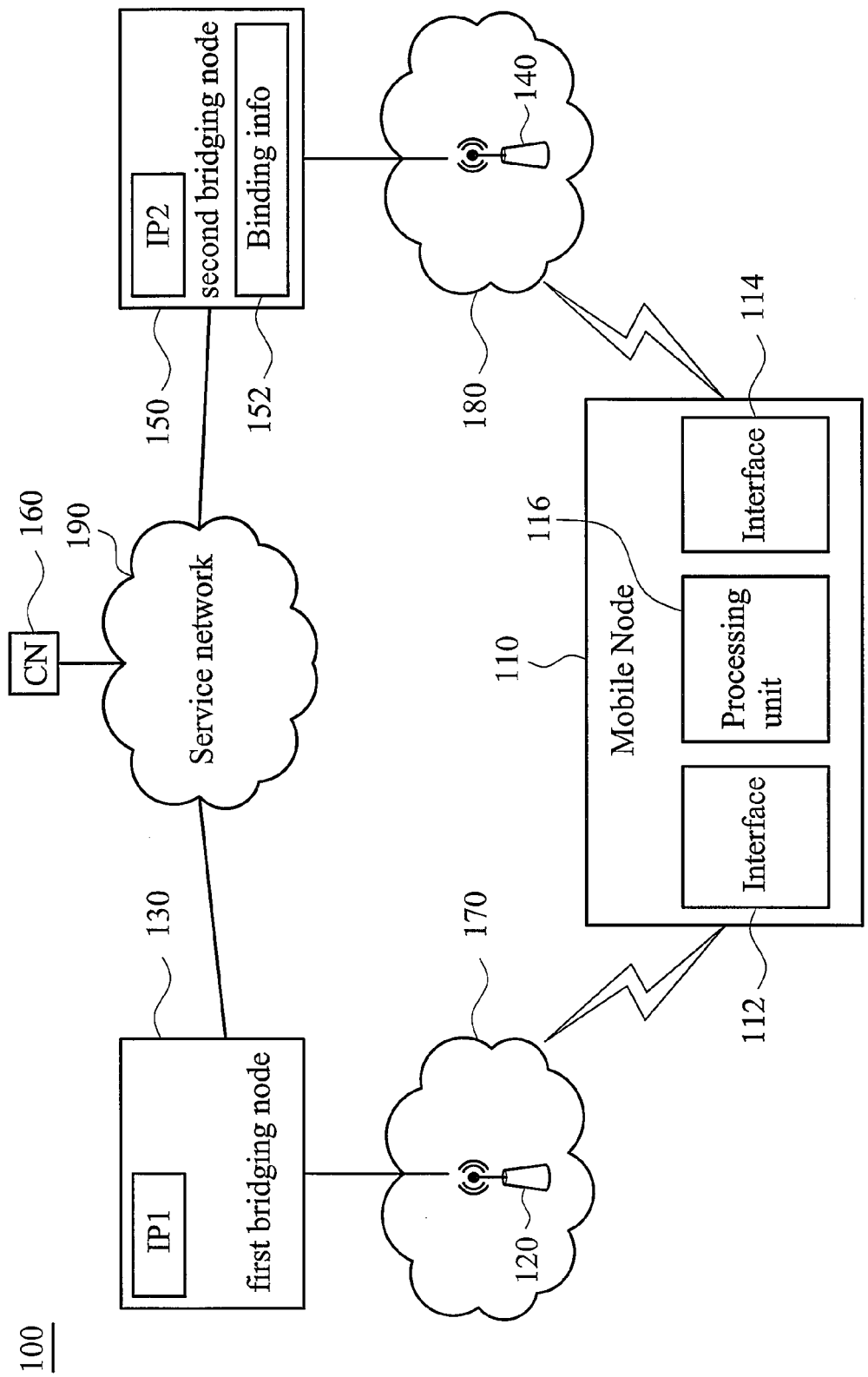
FIG. 1 shows a generic communication system according to an embodiment of the invention.
Figure 2A:
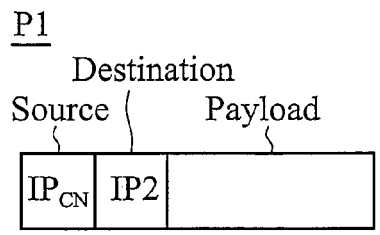
FIGS. 2A-2C are schematic diagrams illustrating tunneling and de-tunneling IP packet according to the invention.
Figure 2B:
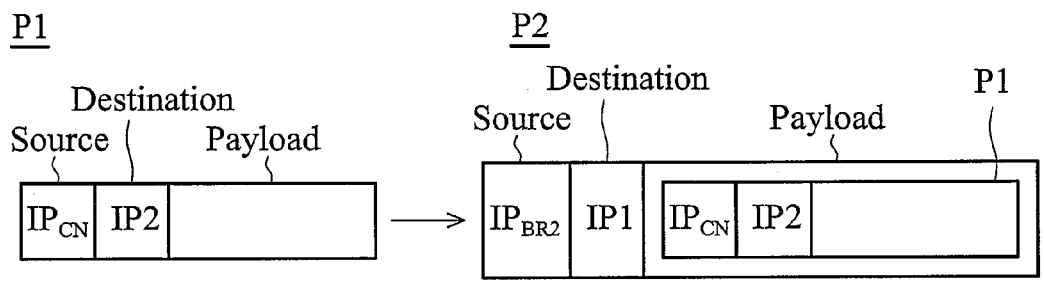
Figure 2C:
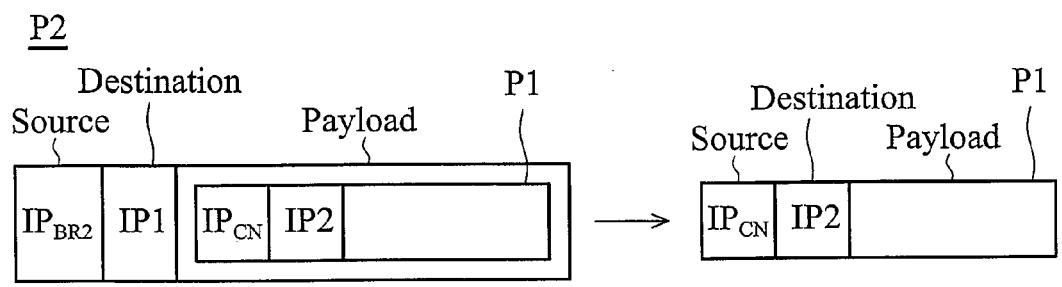

FIG. 1 shows a generic communication system 100 according to an embodiment of the invention, containing at least a service network (SN) 190 and two access networks (ANs) 170 and 180. The generic communication system 100 can be employed in the 3GPP-WLAN inter-working, or general access network (GAN), or mobile IP network architecture, or others. The SN 190 may be Internet or 3G service network, or others. The AN 170 or 180 may be, for example, a Global System for Mobile Communications (GSM), an Enhanced Data Rates for GSM Evolution (EDGE), a Universal Mobile Telecommunications System (UMTS), a Time Division-Synchronous Code Division Multiple Access (TD-SCDMA), a Code Division Multiple Access 2000 (CDMA2000), a World Interoperability for Microwave Access (WiMAX), a Wi-Fi, or the like. A first bridging node 130 is coupled between the AN 170 and the SN 190, and responsible for forwarding packets therebetween. A second bridging node 150 is coupled between the AN 180 and the SN 190, and responsible for forwarding packets therebetween. The bridging node 130 or 150 may be a router, a gateway, Gateway GPRS Support Node (GGSN) plus a Packet Data Gateway (PDG), a GGSN plus a Generic Access Network Controller (GANC), or others. A mobile node (MN) 110 is equipped with two interfaces 112 and 114, and a processing unit 116 for communicating with a corresponding node (CN) 160 through either the AN 170 or the AN 180. For communicating with the CN 160 through the SN 190 and AN 170, the MN 110 acquires a first Internet Protocol (IP) address assigned by the first bridging node 130. When receiving packets containing a destination of the first IP address from the SN 190, the bridging node 130 forwards the received packets to the AN 170, so as to a wireless access station 120 forwards the packets to the MN 110 through the first interface 112. The MN 110 may also transmit packets containing a source of the first IP address and a destination corresponding to the CN 160 to the first bridging node 130 through the first interface 112 and the AN 170, so as to the first bridging node 130 forwards the packets to the CN 160 through the SN 190. In addition, for communicating with the CN 160 through the SN 190 and AN 180, the MN acquires a second IP address assigned by the second bridging node 150. Details of packet exchange between the CN 160 and MN 110 through the SN 190 and AN 180 may be deduced by the analogy. The wireless access station 120 or 140 may be a base station (BS), an access point (AP) or the like. It is to be understood that, before the acquisition of first or second IP address, the MN 110 is successfully registered in the AN 170 and 180, and authenticated and authorized to access the SN 190. It is to be understood that the first IP address belongs to a first IP domain managed by the first bridging node 130 while the second IP address belongs to a second IP domain managed by the second bridging node 150.

To minimize the power consumption, the MN 110 selects only one interface, e.g. 112, as awake interface. The selection of the awake interface may be based on user preference, received signal strength, the power consumption of interfaces 112 and 114, or others. The MN 110 directs the second bridging node 150 to generate a cache binding information 152 indicating a binding of the second IP address to the first IP addresses using a binding update procedure. After the binding information is successfully generated, the MN turns the second interface 114 off. When receiving packets containing a destination of the second IP address from the CN 160 (as shown in P1 of FIG. 2A), the second bridging node 150 detects the cached binding information, tunnels the received packets with new packet headers each containing a destination of the first IP address (as shown in P2 of FIG. 2B), and routes the tunneled packets to the first bridging node 130 through the SN 190, so as to the first bridging node 130 to transmit the tunneled packets to the MN 110 with the first interface 112.

Figure 3A:
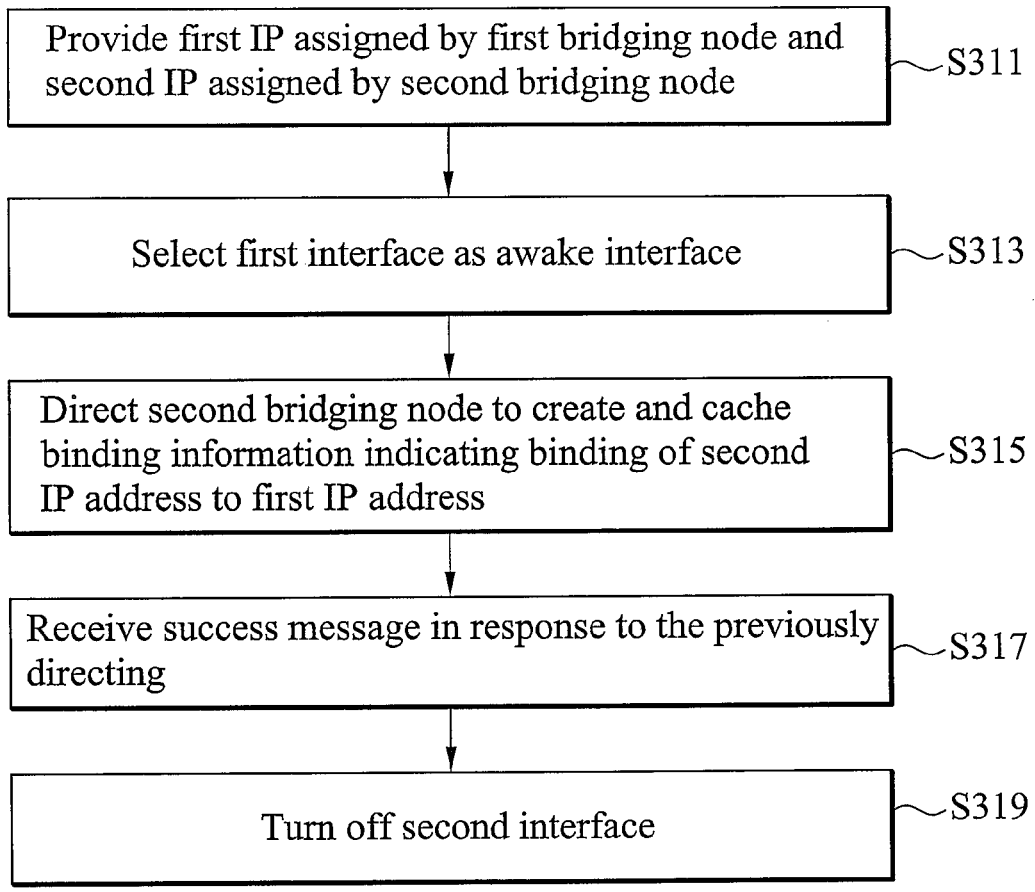
FIG. 3A is a flowchart of a method for turning the second interface off to reduce power consumption according to an embodiment of the invention.

An embodiment of a method for turning the second interface 114 off to reduce power consumption, performed by the processing unit 116 of the MN 110, is shown in FIG. 3A. A first IP address assigned by the first bridging node 130 and a second IP address assigned by the second bridging node 150 are provided (step S311). The first interface is selected as an awake interface (step S313). The first interface may be a preferred interface set by a user, or may consume less power than that by the second interface, or signal strength of listened signals via the first interface may be stronger than that via the second interface. The second bridging node 150 is directed to create and cache binding information indicating a binding of the second IP address to the first IP address using a binding update procedure (step S315). In the binding update procedure, the processing unit 116 may issue a message or command for asking the second bridging node 150 to create and cache the binding information. The second interface is turned off (step S319) after receiving a success message in response to the previously directing (step S317).

Referring to FIG. 1, after receiving and de-tunneling the tunneled packets (as shown in P2 and P1 of FIG. 2C) from the first bridging node 130 via the first interface 112, the MN 110 finds out that the received packets are originally transmitted to the MN 110 via the second interface 114. Accordingly, the MN turns the second interface 114 on and directs the second bridging node 150 to erase the cached binding information 152 using a binding update procedure. After that, when receiving packets containing a destination of the second IP address from the CN 160, the second bridging node 150 detects no binding information for the second IP address, and accordingly transmits the received packets to the MN 110 with the second interface 114.

Figure 3B:
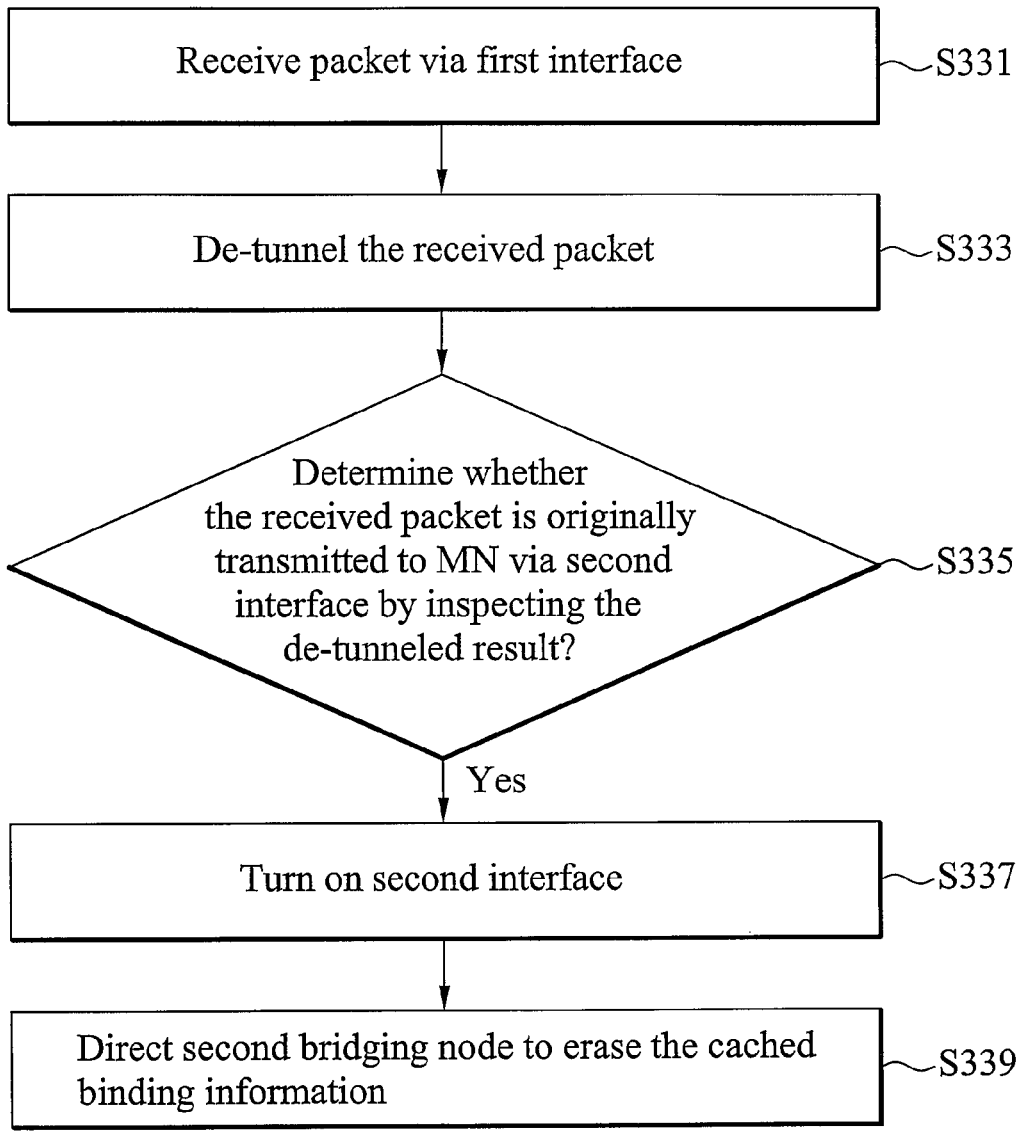
FIG. 3B is a flowchart of a method for turning the second interface on to receive consequent packets from the CN according to an embodiment of the invention.

An embodiment of a method for turning the second interface 114 on to receive consequent packets from the CN 160, performed by the processing unit 116 of the MN 110, is shown in FIG. 3B. A packet is received via the first interface 112 (step S331), and the received packet is de-tunneled (step S333). It is determined whether the received packet is originally transmitted to the MN 110 via the second interface 114 by inspecting the de-tunneled result (step S335). Specifically, the processing unit 116 inspects whether the de-tunneled result contains a packet header comprising a destination of the second IP address (as shown in P1 of FIG. 2C). It is to be understood that, once detecting that a packet received via the first interface 112 is originally transmitted to the second interface 114 via the AN 180, the processing unit 116 understands that more packets each comprising a destination of the second IP address are being transmitted or will be transmitted by the CN 160. The processing unit 116 may determine whether to continue to use the first interface 112 to communicate with the CN 160. If so, the processing unit 116 issues a binding update request to force the CN 160 to create binding information indicating a binding of the IP2 to the IP1. Thereafter, the CN 160 will transmit subsequent packets to the first interface 112 of the MN 110. Otherwise, the processing unit 116 may decide which interface on MN 110 (say interface N) to communicate with CN 160 and update the binding information 152 on the second bridging node 150 and the CN 160. The selection of the interface N can be based on the signal strength, power consumption, throughput, and access cost of the interfaces. The binding information 152 on the second bridging node 150 and the CN is to map the IP2 to the IP of the interface N. If MN decides to use the second interface 114 to communicate with CN, the second interface 114 is turned on (step S337), and then, the second bridging node 150 is directed to erase the cached binding information indicating the binding of the second IP address to the first IP address using the second interface 114 so as to receive consequent packets via the second interface 114 (step S339).

Figure 4:
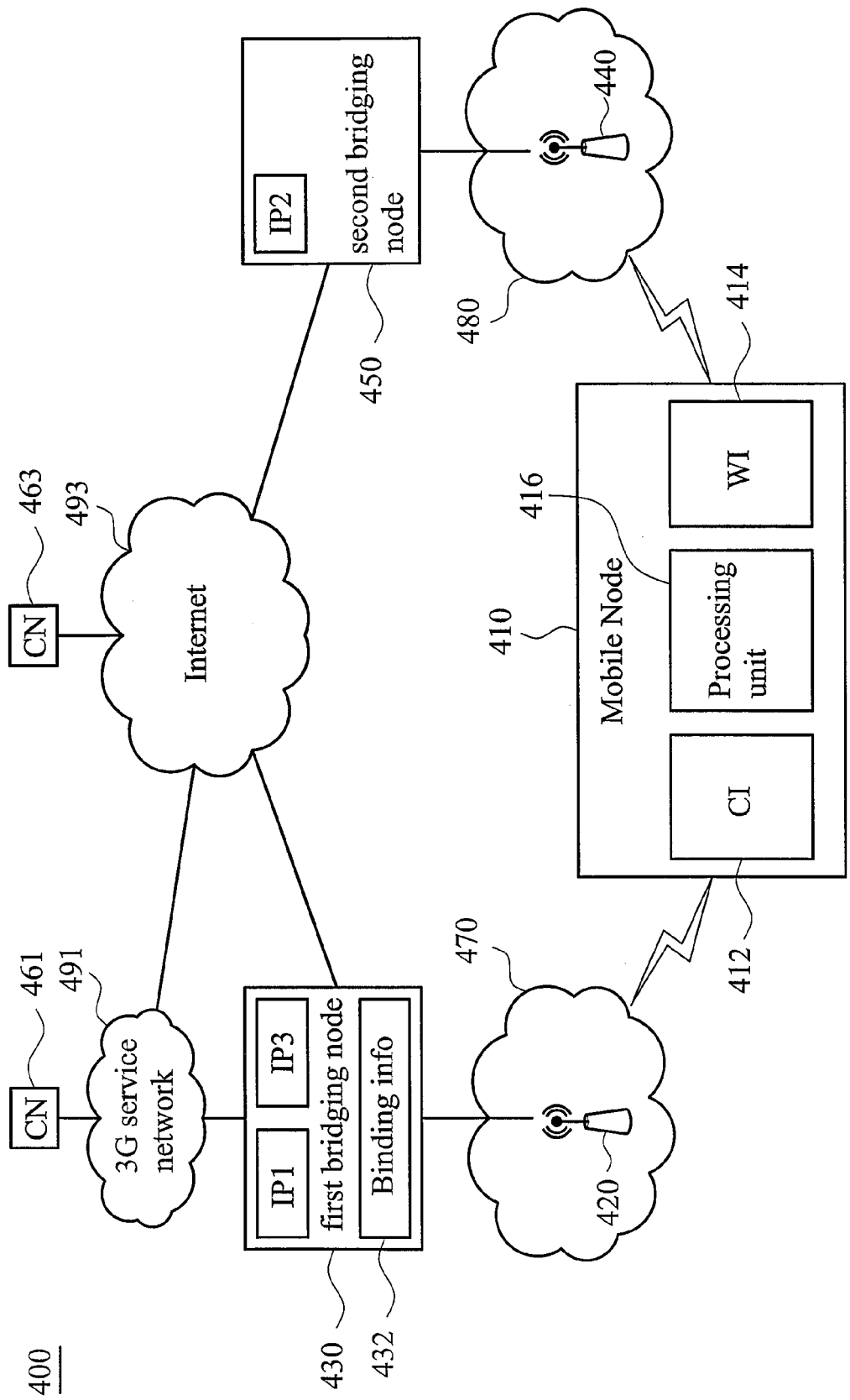
FIG. 4 shows a 3GPP-WLAN inter-working or GAA communication system according to an embodiment of the invention.
Figure 5A:
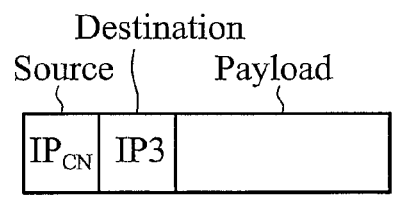
FIGS. 5A-5B are schematic diagrams illustrating tunneling IP packet for use in the embodiment of FIG. 4.
Figure 5B:
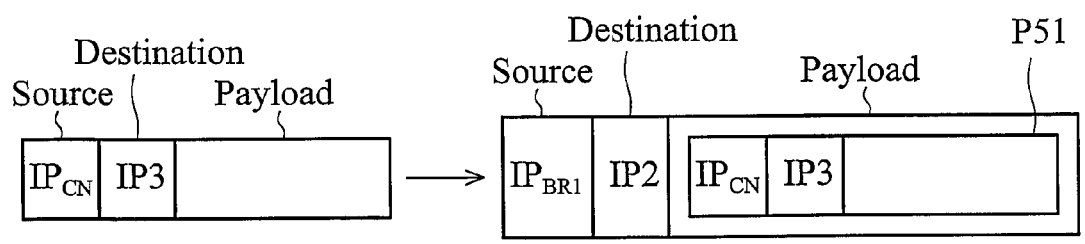

Embodiments for 3GPP-WLAN Inter-Working and Generic Access Architecture (GAA) Communication System FIG. 4 shows a 3GPP-WLAN inter-working or GAA communication system 400 according to an embodiment of the invention, containing at least a GSM/GPRS/3G service network 491 and an Internet 493. The AN 470 may be, for example, a Universal Mobile Telecommunications System (UMTS), a Time Division-Synchronous Code Division Multiple Access (TD-SCDMA), a Code Division Multiple Access 2000 (CDMA2000), a World Interoperability for Microwave Access (WiMAX), or the like. The AN 480 may be, for example, a Wi-Fi, WiMAX or the like. A first bridging node 430, such as a GGSN plus a PDG, or a GGSN plus a GANC, or others, is coupled between the AN 470, the GSM/GPRS/3G service network 491 and the Internet 493. A second bridging node 450, such as a router, a gateway, or others, is coupled between the AN 480 and the Internet 493. An MN 410 is equipped with a cellular interface (CI) 412 and a wireless interface (WI) 414 for communicating with a CN 461 through the GSM/GPRS/3G service network 491 or a CN 463 through the Internet 493.

For communicating with the CN 461 through the 3G service network 491 and the AN 470, or with the CN 463 through the Internet 493 and the AN 470, the MN 410 acquires a first IP address assigned by the first bridging node 430. When receiving packets containing a destination of the first IP address and a source of the CN 461 or 463, the bridging node 430 routes the received packets to the AN 470, so as to a base station 420 forwards the packets to the MN 410 through the CI 412. The MN 410 may also transmit packets containing a source of the first IP address and a destination corresponding to the CN 461 or 463 to the first bridging node 430 through the CI 412 and the AN 470, so as to the first bridging node 430 forwards the packets to the CN 461 through the SN 491.

In addition, for communicating with the CN 463 through the Internet 493 and AN 450, the MN 410 acquires a second IP address assigned by the second bridging node 450. Details of packet exchange between the CN 463 and MN 410 through the Internet 493 and AN 480 comprising an access point (AP) may be deduced by the analogy. For communicating with the CN 461 through the 3G service network 461 and AN 480, the MN acquires a third IP address assigned by the first bridging node 430. Meanwhile, the first bridging node 430 creates and caches binding information 432 indicating a binding of the third IP address to the second IP address. When receiving packets containing a destination of the third IP address from the CN 461 (as shown in P51 of FIG. 5A), the first bridging node 430 detects the cached binding information indicating the binding of the third IP address to the second IP address, tunnels the received packets with new packet headers each containing a destination of the second IP address (as shown in P52 of FIG. 5B), and routes the tunneled packets to the second bridging node 450 through the Internet 493, so as to the AP 480 forwards the tunneled packets to the MN 410 through the WI 414. The MN 410 may also transmit packets containing a source of the third IP address and a destination corresponding to the CN 461 to the second bridging node 450 through the WI 414 and the AN 480, so as to the second bridging node 450 forwards the packets to the CN 461 through the Internet 493, the first bridging node 430 and the GPRS/3G service network 491 in sequence. It is to be understood that the first and third IP addresses belongs to a first IP domain managed by the first bridging node 430 while the second IP address belongs to a second IP domain managed by the second bridging node 450. In addition, only mobile nodes with IP addresses belonging to the first IP domain can access resources in the GPRS/3G service network 491.

Figure 6:
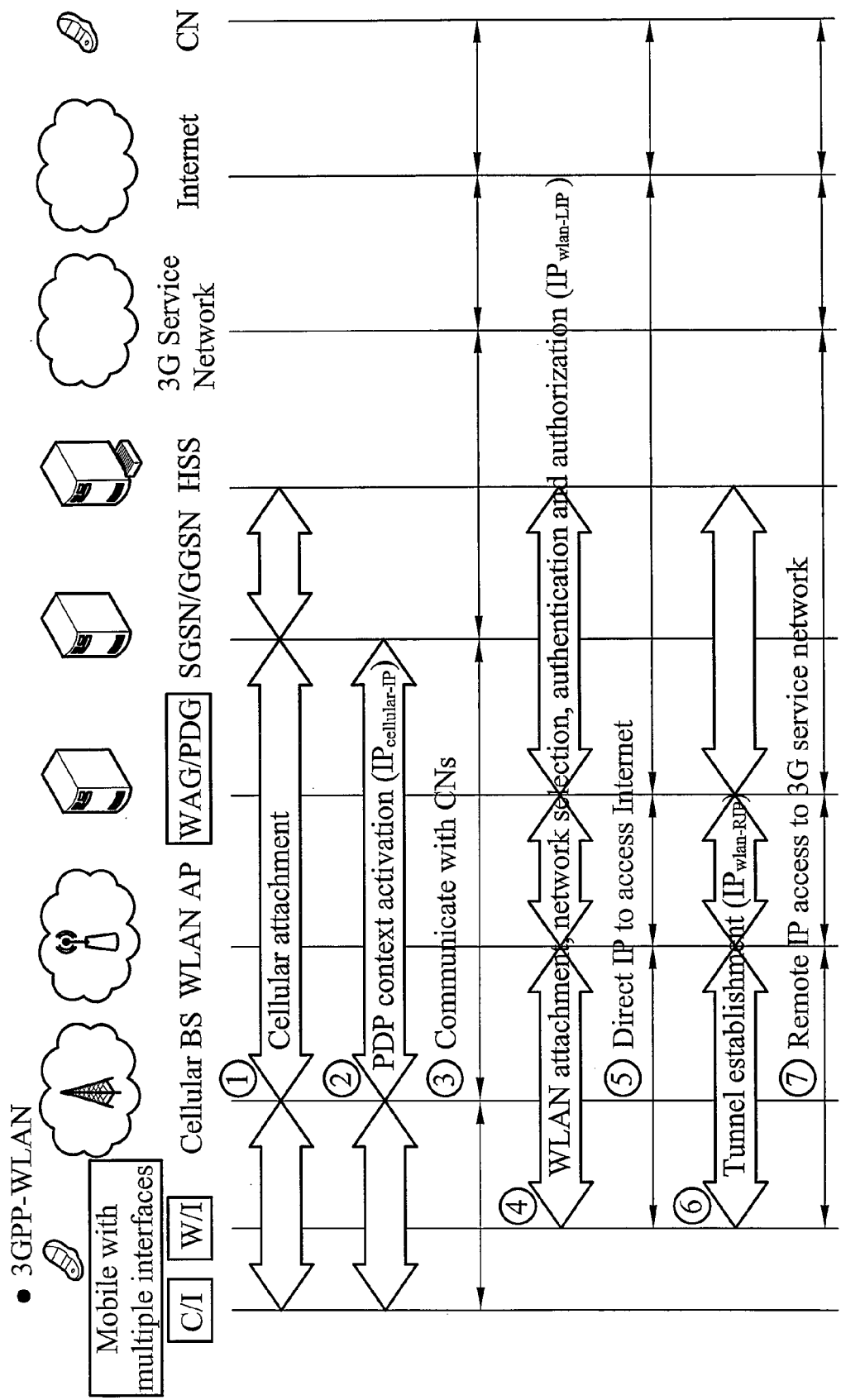
FIG. 6 is a sequence diagram illustrating interactions between stations in the 3GPP-WLAN inter-working communication system according to an embodiment of the invention.

FIG. 6 is a sequence diagram illustrating interactions between stations in the 3GPP-WLAN inter-working communication system according to an embodiment of the invention. An MN is equipped with dual communication interfaces (3G-WLAN), such as a CI and a WI. In the 3GPP-WLAN inter-working network architecture, a Wireless Access Gateway (WAG) is connected to a SGSN and all the packets will be sent to the WAG and then routed to a GGSN regardless of whether users use WLAN or 3G networks for services with their dual mode equipment.

As shown in FIG. 6, (1) the MN first performs a series of cellular attachment procedures with a cellular BS, an SGSN/GGSN and a Home Subscriber Server (HSS, if necessary) to register with a cellular network (i.e. an AN) through the CI. For example, the MN may send a registration request to the BS through the CI and then the BS forwards the request to the SGSN/GGSN for authenticating and authorizing the MN and acquires the authentication and authorization information of the MN from the HSS if necessary, and, upon receiving authentication and authorization result, the MN is allowed to attach to the cellular network.

(2) The MN performs PDP context activation procedure to activate Packet Data Protocol (PDP) contexts to the SGSN/GGSN. After the PDP context activation procedure has been performed, the MN acquires a cellular IP address (IP1) from the SGSN/GGSN to access the 3G service network, or Internet, or the others.

Therefore, (3) the MN is capable of communicating with a CN in the Internet or a CN in the 3G service network through the cellular network and the CI.

(4) The MN performs a series of WLAN attachment, network selection, authentication and authorization procedures to register with the WLAN and the Internet through the WI. For example, the MN may send a registration request to the WLAN AP through the WI and request a local IP address (IP2) for accessing the WLAN and the Internet. The assigned local IP address (IP2) is allowed to access the Internet when the MN is authenticated and authorized by the PDG and further by the HSS if necessary.

(5) Once the MN has been successfully authenticated and authorized, the MN is capable of communicating with a CN in the Internet through the WLAN and the WI. If the MN wants to access the 3G service network (e.g. IP Multimedia Subsystem IMS network) through the WLAN and WI, below procedures are implemented.

(6) The MN performs a series of tunnel establishment procedures with the WLAN AP, PDG and HSS to acquire a remote IP for accessing the 3G network services through the WLAN and the WI. In the tunnel establishment procedures, the PDG generates and caches binding information indicating a binding of the remote IP to the local IP (IP2), so as to the PDG tunnels data packets each comprising a destination of the remote IP with a new packet header comprising a destination of the local IP (IP2).

(7) Once the MN successfully acquires the remote IP, the MN is capable of accessing the 3G service network with the remote IP, and receiving the data packets destined to the remote IP from a CN in the 3G service network.

Figure 7:
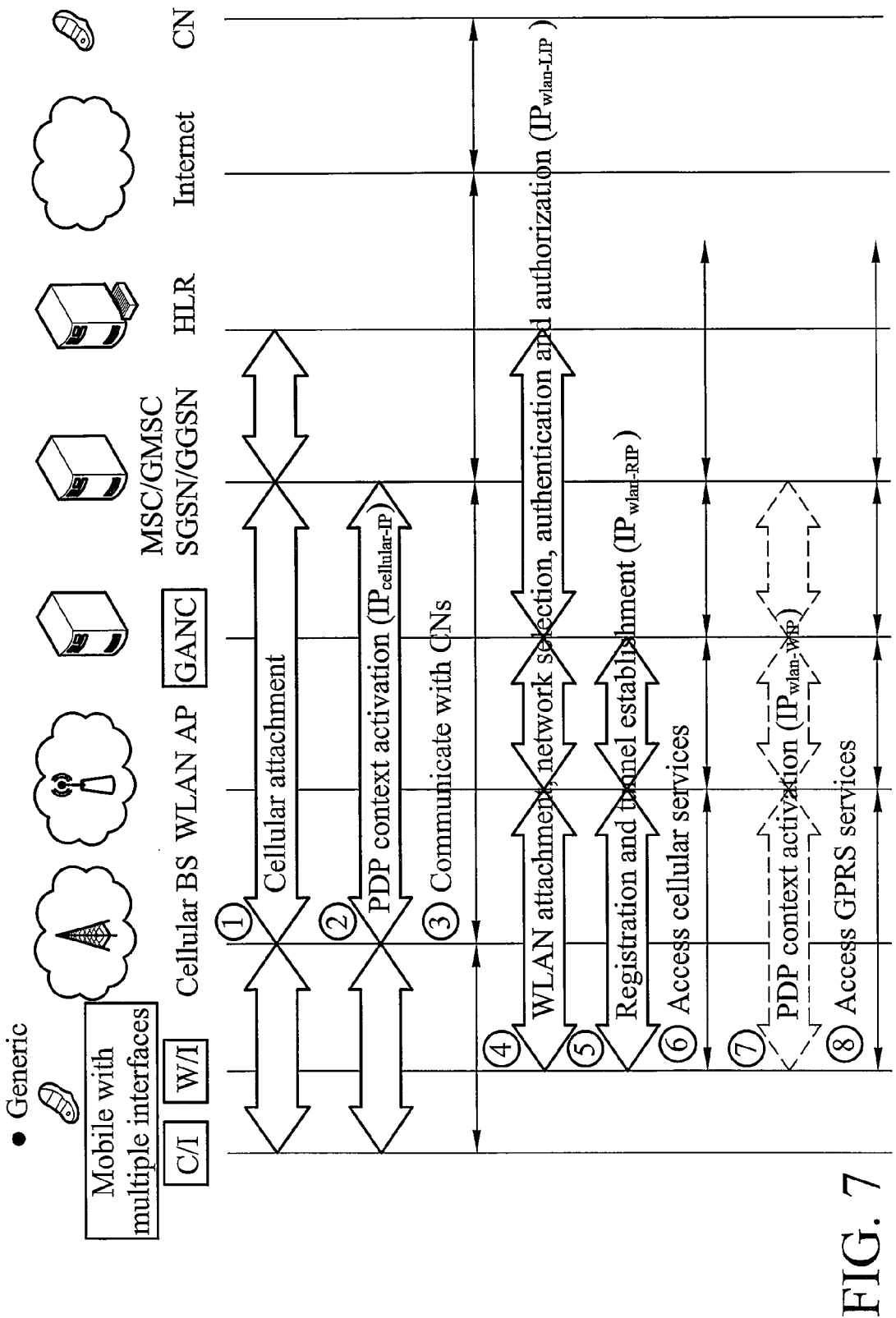
FIG. 7 is a sequence diagram illustrating interactions between stations in the GAA communication system according to an embodiment of the invention.
Figure 8A:
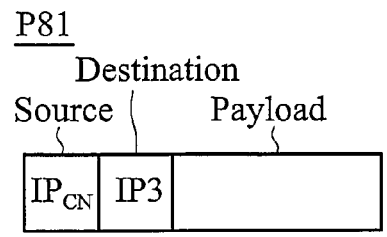
FIGS. 8A-8C are another schematic diagrams illustrating tunneling and de-tunneling IP packet for use in the embodiment of FIG. 4.
Figure 8B:
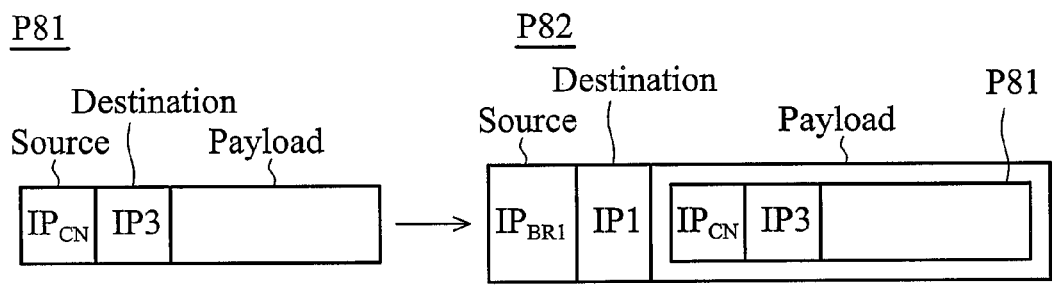
Figure 8C:
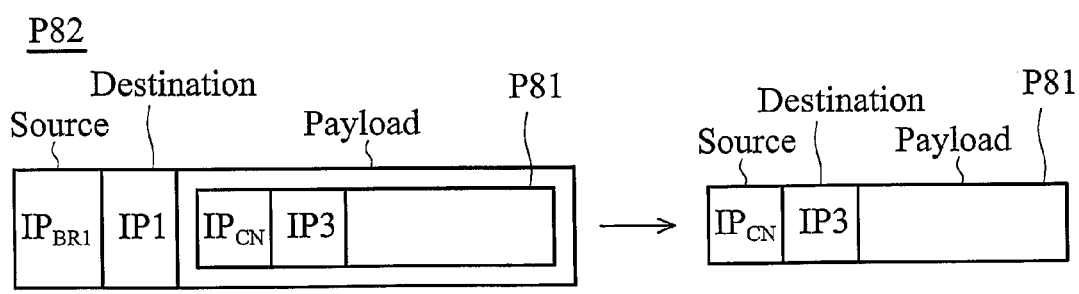

FIG. 7 is a sequence diagram illustrating interactions between stations in the GAA communication system according to an embodiment of the invention. An MN is equipped with dual communication interfaces (3G-WALN), such as a CI and a WI. In the GAA, a generic access network controller (GANC) is connected to a Mobile Switching Center (MSC, similar to SGSN) and all the multimedia packets will be sent to the MSC and then routed to a gateway mobile switching center (GMSC, similar to GGSN) regardless of whether users use Internet or 3G networks for multimedia services with their dual mode equipment. The interactions shown in FIG. 7 are similar to that in 3GPP-WLAN inter-working system architecture of FIG. 6.

For (1), (2) and (3) of FIG. 7 similar with that of FIG. 6, details of (1), (2) and (3) of FIG. 7 may be deduced by the analogy with the description of FIG. 6, and do not described herein for brevity.

(4) The MN performs a series of WLAN attachment, network selection, authentication and authorization procedures to register with the WLAN and the Internet through the WI. For example, the MN may send a registration request to the WLAN AP through the WI and request a local IP address (IP2) for accessing the WLAN and the Internet. The assigned local IP address (IP2) is allowed to access the Internet when the MN is authenticated and authorized by the GANC and further by a home location register (HLR) if necessary. Once the MN has been successfully authenticated and authorized, the MN is capable of communicating with a CN in the Internet through the WLAN and the WI. If the MN wants to access the 3G and/or GRPS service network through the WLAN, below procedures are implemented. Since the WLAN AP operates as a role similar with the BS of the GAA, the MN has to register with the GANC.

(5) Therefore, the MN performs a series of registration and tunnel establishment procedures to acquire a remote IP address (IP3) from the GANC for accessing the GSM network through the WI and WLAN AP. For example, the MN may send a registration request to the WLAN AP, which operates like the BS, through the WI and then the WLAN AP forwards the request to the GANC for authenticating and authorizing the MN, and, upon receiving the authentication and authorization result, the MN is allowed to attach to the 3G service network using the assigned remote IP.

(6) The MN is capable of accessing the 3G network using the assigned remote IP through the WI.

If the MN requests to access the GPRS service network, (7) the MN performs PDP context activation procedure to activate PDP contexts to the SGSN/GGSN through the GANC. After the PDP context activation procedure has been performed, the MN acquires a WLAN IP address from the SGSN/GGSN to access the GPRS service network.

(8) Once the MN successfully acquires the WLAN IP address, the MN is capable of accessing the GPRS network with the WLAN IP address, and receiving data packets destined to the WLAN IP address from a CN in the GPRS network.

It is observed that packets sent to the remote or WLAN IP address, associated with the turned-off interfaces of the MN will be lost regardless of whether 3G-WLAN inter-working architecture or the GAA is used.

To minimize the power consumption, the MN 410 selects only CI interface 412 as awake interface. The selection of the awake interface may be based on user preference, received signal strength or power consumption of the CI interfaces 412 and WI interface 414, or others. The MN 410 directs the first bridging node 430 to update the cached binding information 432 with that indicating a binding of the third IP address to the first IP addresses using a binding update procedure. After the binding information 432 is successfully updated, the MN 410 turns the WI 414 off. When receiving packets containing a destination of the third IP address from the CN 461 (as shown in P81 of FIG. 8A), the first bridging node 430 detects the cached binding information, tunnels the received packets with new packet headers each containing a destination of the first IP address (as shown in P82 of FIG. 8B), and routes the tunneled packets to the AN 470, so as to the base station 420 to transmit the tunneled packets to the MN 410 with the CI 412.

Figure 9A:
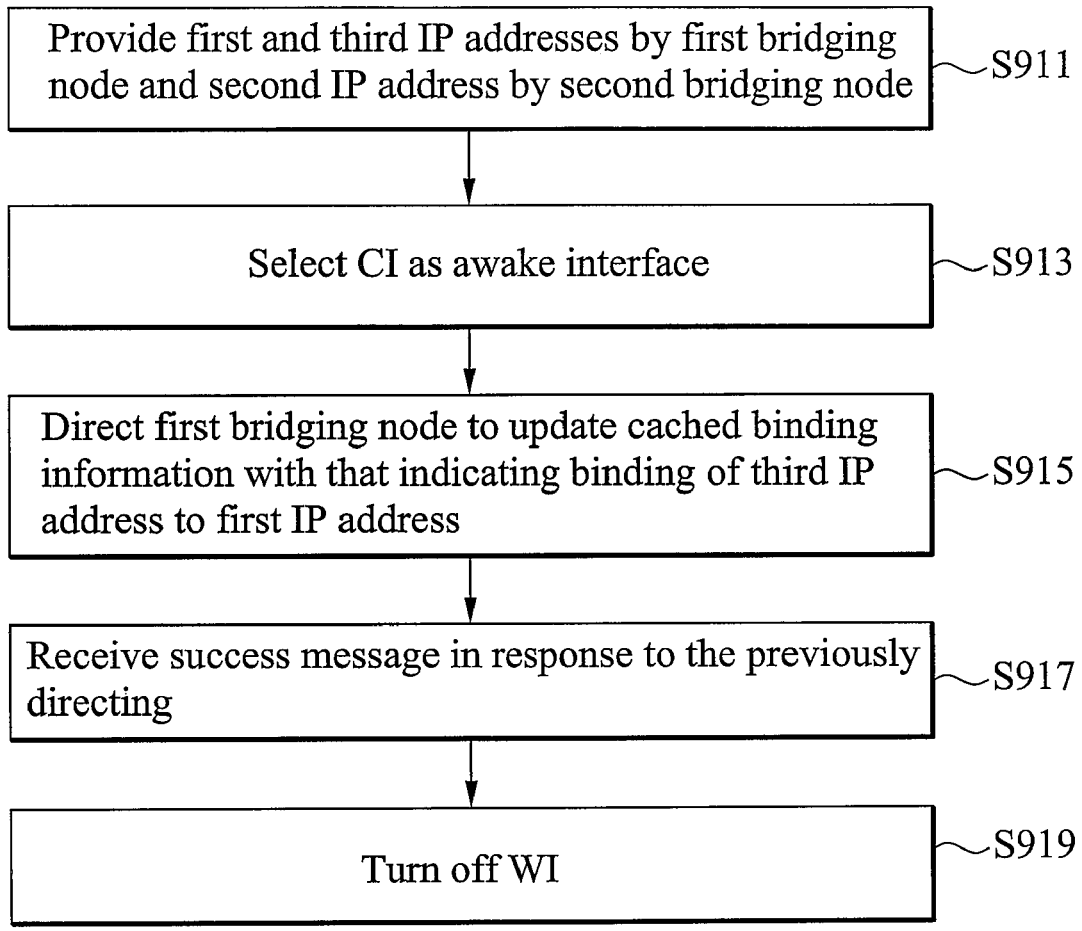
FIG. 9A is a flowchart of a method for turning the WI off to reduce power consumption according to an embodiment of the invention.

An embodiment of a method for turning the WI 414 off to reduce power consumption, performed by the processing unit 416 of the MN 410, is shown in FIG. 9A. A first and third IP addresses assigned by the first bridging node 130 and a second IP address assigned by the second bridging node 150 are provided (step S911). The CI 412 is selected as an awake interface (step S913). The second bridging node 150 is directed to update the cached binding information with that indicating a binding of the third IP address to the first IP address using a binding update procedure (step S915). In the binding update procedure, the processing unit 116 may issue a message or command for asking the first bridging node 430 to update the cached binding information 432. The WI 414 is turned off (step S919) after receiving a success message in response to the previously directing (step S917).

Referring to FIG. 4, after receiving and de-tunneling the tunneled packets (as shown in P82 and P81 of FIG. 8C) from the first bridging node 430 via the CI 412, the MN 410 finds out that the received packets are originally transmitted to the MN 410 via the WI 414. Accordingly, the MN turns the WI 414 on and directs the first bridging node 430 to update the cached binding information 432 with that indicating the binding of the third IP address to the second IP address using a binding update procedure. After that, when receiving packets containing a destination of the third IP address from the CN 461, the first bridging node 430 detects the up-to-date binding information 432, and accordingly tunnels the received packets with new packet headers each comprising a destination of the second IP address, and routes the tunneled packets to the second bridging node 450, so as to the second bridging node 450 forwards the tunneled packets to the MN 410 through the AN 480 and the WI 414. In some embodiments, the MN 410 may want to continue to use the CI 412 to communicate with the CN 461 and issue a binding update request to force the CN 461 to create binding information indicating a binding of the IP3 to the IP1. Thereafter, the CN 461 will transmit subsequent packets to the CI 412 of the MN 410.

Figure 9B:
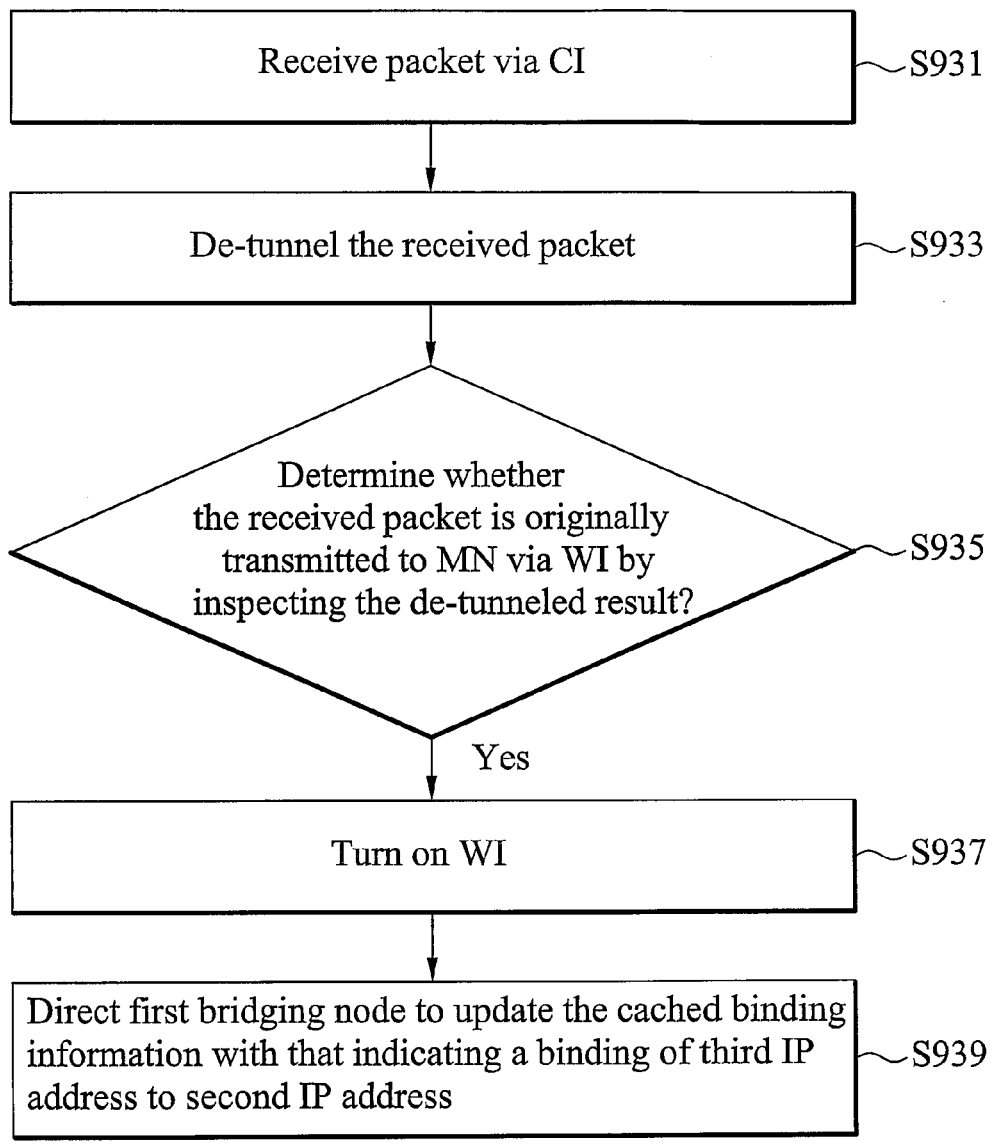
FIG. 9B is a flowchart of a method for turning the WI on to receive consequent packets from the CN according to an embodiment of the invention.

An embodiment of a method for turning on the WI 414 to receive consequent packets from the CN 461, performed by the processing unit 416 of the MN 410, is shown in FIG. 9B. A packet is received via the CI 412 (step S931), and the received packet is de-tunneled (step S933). It is determined whether the received packet is originally transmitted to the MN 410 via the WI 414 by inspecting the de-tunneled result (step S935). Specifically, the processing unit 416 inspects whether the de-tunneled result contains a packet header comprising a destination of the third IP address (as shown in P81 of FIG. 8C). It is to be understood that, once detecting that a packet received via the CI 412 is originally transmitted to the MN 410 via the WI 414, the processing unit 416 understands that more packets each comprising a destination of the third IP address are being transmitted or will be transmitted by the CN 461. If so, the WI 414 is turned on (step S937), and then, the first bridging node 430 is directed to update the cached binding information with that indicating the binding of the third IP address to the second IP address to receive consequent packets via the WI 414 (step S939).

Figure 10:
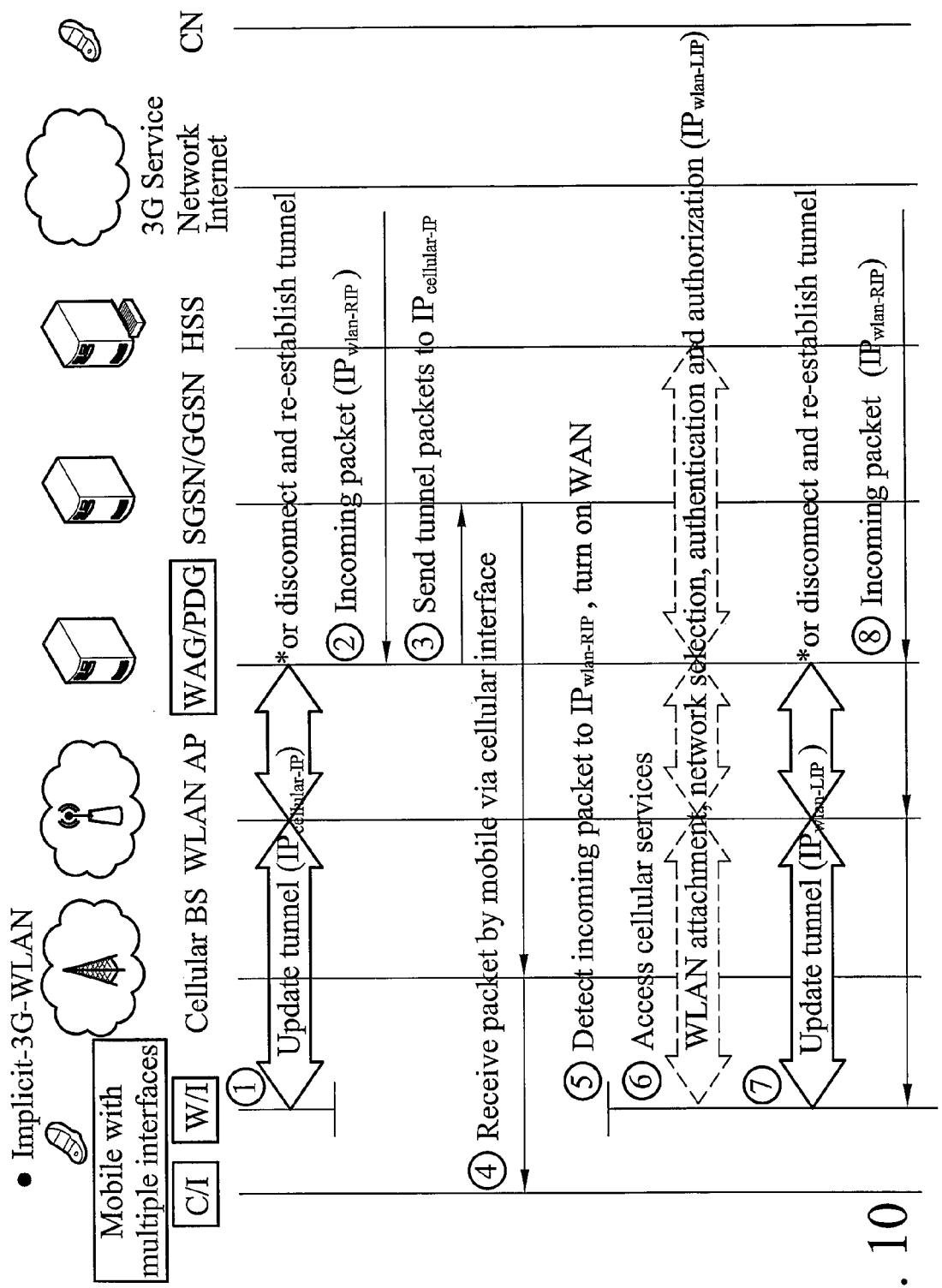
FIG. 10 is a sequence diagrams illustrating interactions between stations in the 3GPP-WLAN inter-working architecture according to an embodiment of the invention.

FIG. 10 is a sequence diagrams illustrating interactions between stations in the 3GPP-WLAN inter-working architecture according to an embodiment of the invention. An MN with a CI for communicating with a cellular network (i.e. an access network) and a WI for communicating with a WLAN (i.e. an access network) is provided. Prior to interactions illustrated in FIG. 10, interactions shown in FIG. 6 have been performed. Initially, the MN activates the CI and WI, and attaches to the cellular network and WLAN via the activated interfaces. Therefore, the MN has a cellular IP address (IP1) for accessing both the 3G service network and the Internet through the cellular network and the CI, a local IP address (IP2) for accessing the Internet through the WLAN and the WI, and a remote IP address (IP3) for accessing the 3G service network through the WLAN and the WI. The MN selects and sets the CI as an awake interface.

As shown in FIG. 10, (1) a binding update procedure is performed to update the cached binding information with that indicating a binding of the remote IP to the cellular IP (IP1) in the PDG. After the cached binding information is updated, the WI of the MN is turned off.

(2) When packets each comprising a destination of the remote IP address (IP3) are sent, the packets are routed to the PDG.

(3) Since detecting the binding information indicating a binding of the remote IP address (IP3) to the cellular IP address (IP1), the PDG tunnels and routes the packets to the GGSN.

(4) The GGSN routes the tunneled packets to the MN through the CI.

(5) Upon receiving the tunneled packets, the MN de-tunnels the received packets and realizes that the tunneled packets are originally sent to the MN through the WI. Then, the MN turns the WI on.

Because the MN may move to another area and lost the link with the original WLAN AP, (6) the MN may perform a series of WLAN attachment, network selection and authentication and authorization procedures to register with a new WLAN AP and to acquire another local IP address (IP2) for use in the new WLAN through the WI. Note that step (6) may not be performed if the MN does not move out the coverage of the original WLAN AP.

(7) After acquiring a new local IP (IP2), the MN performs a tunnel update procedure to update the cached binding information with that indicating a binding of the remote IP address (IP3) to the original/new local IP address (IP2) in the PDG.

(8) Then, the PDG can route subsequent incoming packets destined to the remote IP to the MN through the WI.

Figure 11:
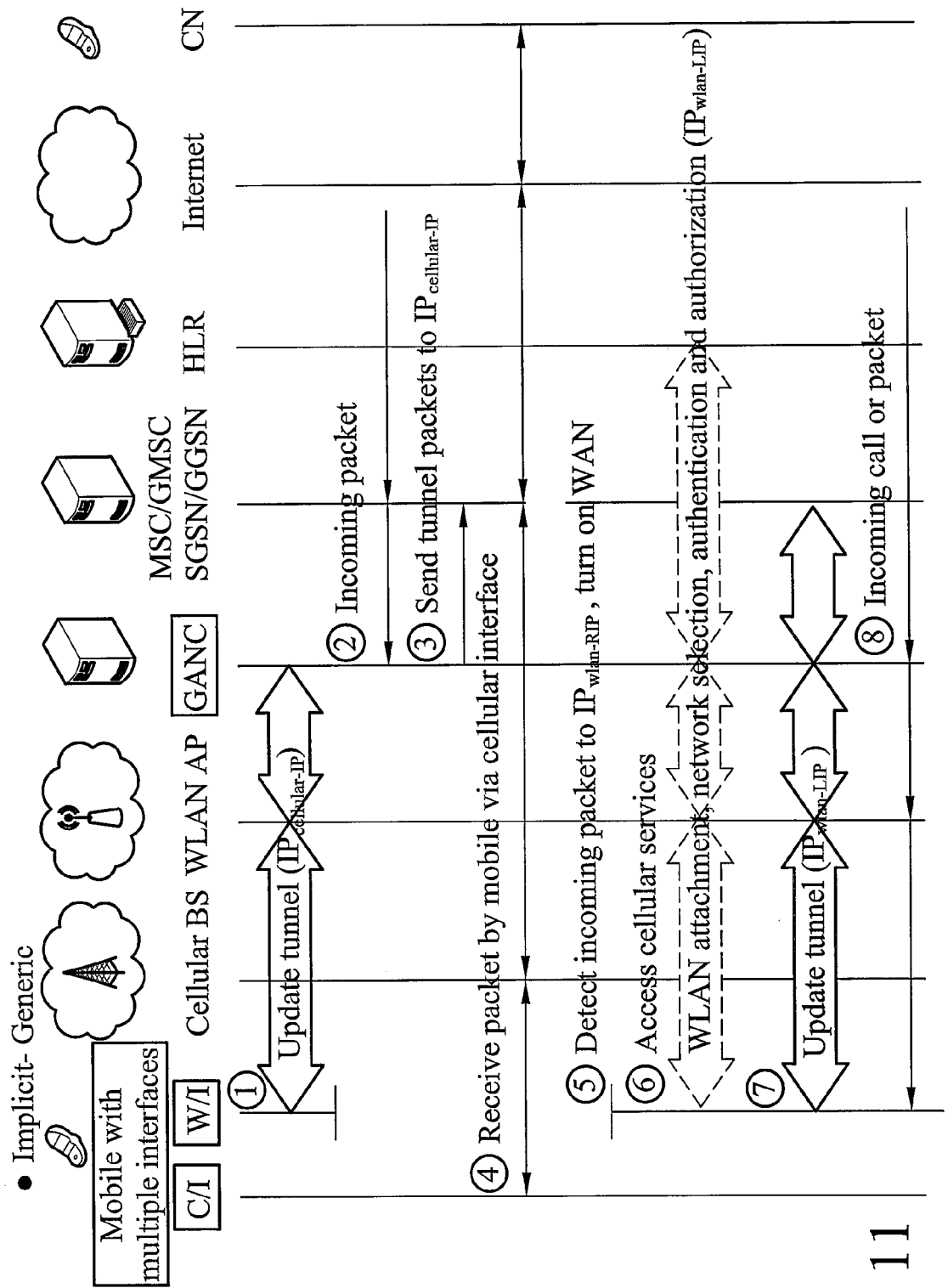
FIG. 11 is a sequence diagram illustrating interactions between stations in the GAA according to an embodiment of the invention.

FIG. 11 is a sequence diagram illustrating interactions between stations in the GAA according to an embodiment of the invention. An MN with a CI for communicating with a cellular network (i.e. an access network) and a WI for communicating with a WLAN (i.e. an access network) is provided. Prior to interactions illustrated in FIG. 11, interactions shown in FIG. 7 have been performed. Initially, the MN activates the CI and WI, and attaches to the cellular network and WLAN via the activated interfaces. Therefore, the MN has a cellular IP address (IP1) for accessing both the 3G service network and the Internet through the cellular network and the CI, a local IP address (IP2) for accessing the Internet through the WLAN and the WI, a remote IP address (IP3) for accessing the 3G service network through the WLAN and the WI, and a wild IP address for accessing the GPRS service network through the WLAN and the WI. The MN selects and sets the CI as an awake interface. The steps (1)-(8) illustrated in FIG. 11 are similar to those illustrated in FIG. 10 except that the PDG is replaced with the GANC and the GGSN is replaced with the GMSC. Detailed descriptions of steps (1)-(8) are omitted herein for brevity.

Figure 12:
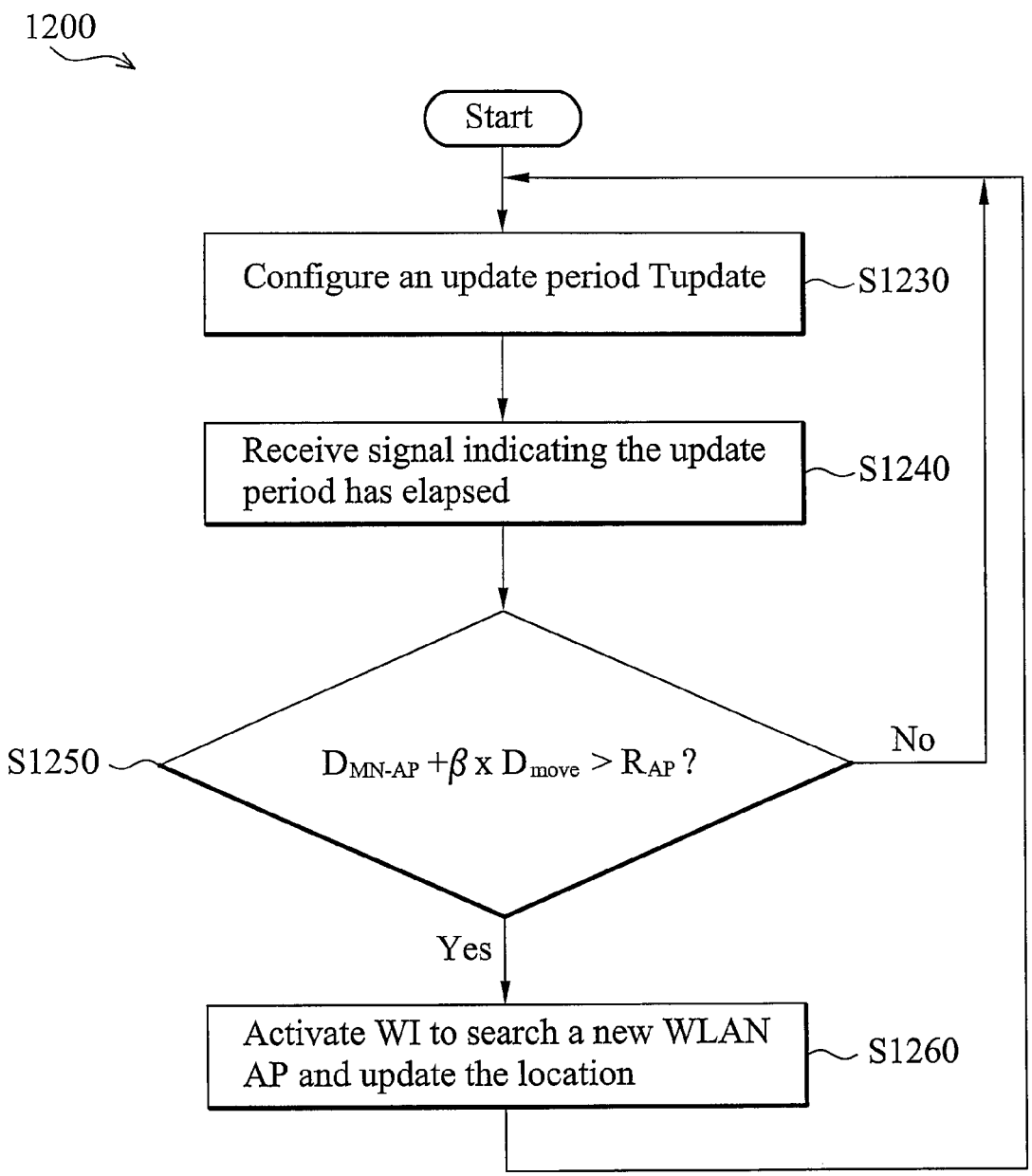
FIG. 12 is a flowchart of a method for periodically listening to the paging to establish a connection with a new WLAN AP according to an embodiment of the invention.

It is to be noted that, after the WI has been turned on, the MN may move to a region out of the coverage of the previously connected WLAN AP. In such situation, the MN has to establish a connection with a new WLAN AP (such as step (6) of FIG. 10 or 11) and request a new local IP (such as step (7) of FIG. 10 or 11), resulting in increased time for reactivating the turned-off interface. To reduce time for reactivating the turned-off interface, an embodiment of a method for periodically listening to the paging to, if necessarily, establish a connection with a new WLAN AP, performed by the processing unit 416 of the MN 410, between steps (1) and (5) of FIG. 10 or 11, is shown in FIG. 12.

An update period $T_{update}$ is configured (step S1230). The configured $T_{update}$ may be set to a real-time clock (RTC) timer or a software timer so as to the timer to trigger a signal indicating that $T_{update}$ has elapsed. The update period $T_{update}$ can be dynamically changed based on predetermined parameters, such as environmental information, channel conditions, and so on. After configuration (step S1230), a signal indicating that $T_{update}$ has elapsed is repeatedly received from a timer (step S1240). Each time receiving the signal (step S1240), it is determined whether the MN 410 is potentially moved out of an available coverage of the previously attached WLAN AP (step S1250). If so, the WI is activated to discover a new WLAN and accordingly to attach to the newly discovered WLAN if possible, and then, the WI is turned off (step S1260). Otherwise, a next update period is configured (step S1230).

For determination of the MN 410 moving out of an available coverage of the previously attached WLAN, the available coverage area of the previously attached WLAN AP $R_{AP}$, the distance between the WLAN AP and the MN $D_{MN-AP}$, and the moving distance of the MN $D_{MOVE}$ are provided. Here, the moving distance of the MN $D_{MOVE}$ may be evaluated using the variation of signal strengths received by the CI 412. The MN 410 moving out of an available coverage of the previously attached WLAN may be determined when the following condition is satisfied.

$$D_{MN-AP} + \beta \times D_{MOVE} > R_{AP},$$

where $\beta$ is a weighting value, $R_{AP}$ denotes the available coverage area of the previously attached WLAN AP, $D_{MN-AP}$ denotes the distance between the WLAN AP and the MN, and $D_{MOVE}$ denotes the moving distance of the MN according to variations of signal strengths received by the CI.

Figure 13:
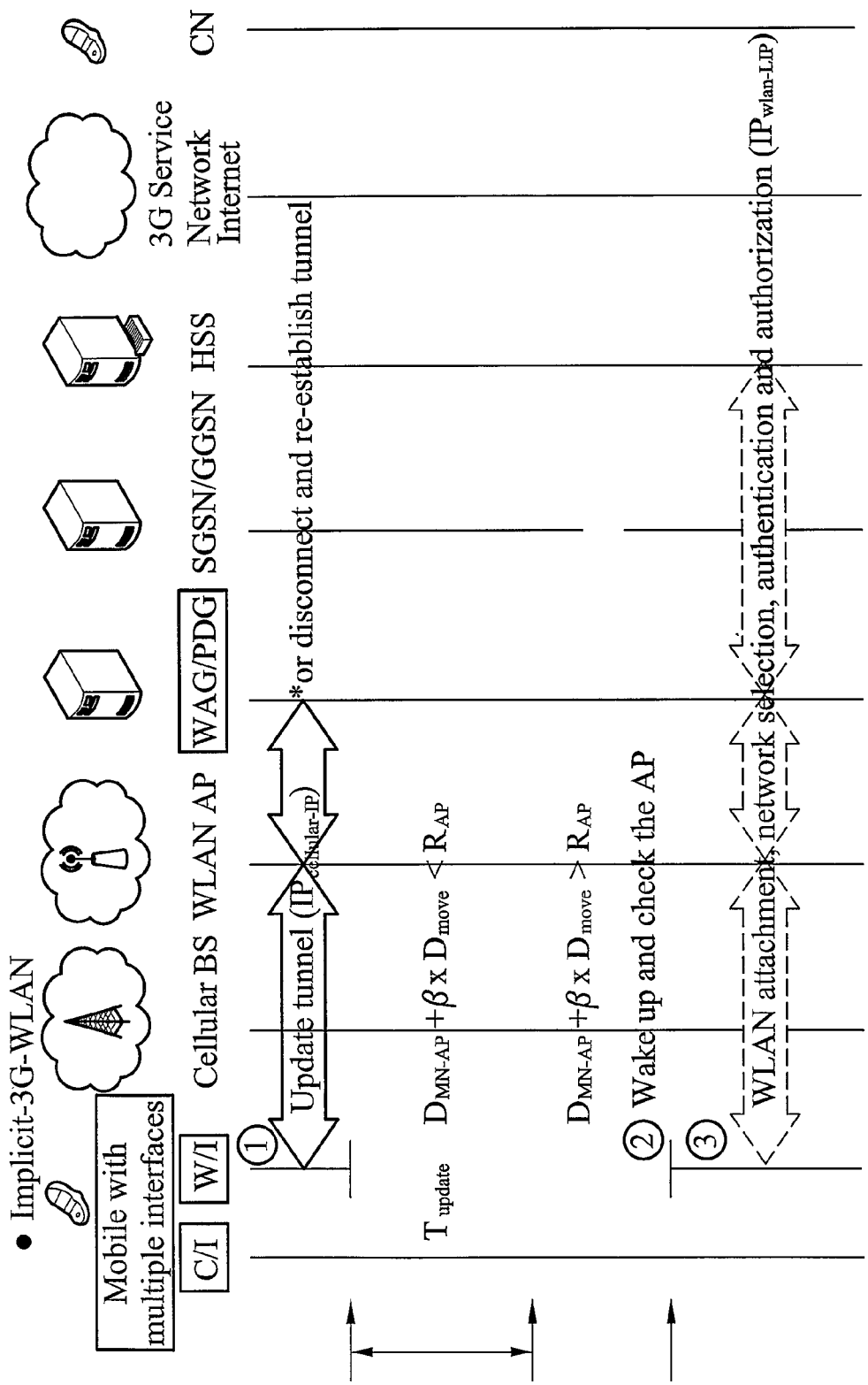
FIG. 13 is a sequence diagram illustrating interactions for periodic WLAN update between stations in the 3GPP-WLAN inter-working architecture according to an embodiment of the invention.

FIG. 13 is a sequence diagram illustrating interactions for periodic WLAN update between stations in the 3GPP-WLAN inter-working architecture according to an embodiment of the invention.

As shown in FIG. 13, step (1) performs operations described in step (1) of FIG. 10. After that, the MN 410 periodically configures an update period $T_{update}$ (e.g. 10 seconds) and accordingly sets a timer. Each time receiving a signal indicating that the update period has elapsed, the MN 410 determines whether $D_{MN-AP} + \beta \times D_{MOVE} > R_{AP}$. If not, the MN 410 reset timer to the update period and waits for a next triggering from the timer.

When determining $D_{MN-AP} + \beta \times D_{MOVE} > R_{AP}$, (2) the MN 410 turns on the WI 414 and inspects whether the MN 410 moves out of an available coverage of the previously attached WLAN (i.e. requires attaching to another WLAN) through the WI.

When the MN 410 requires attaching to another WLAN, (3) the MN 410 performs a series of WLAN attachment, network selection and authentication and authorization procedures to register with a new WLAN AP and to acquire another local IP address for use in the new WLAN through the WI. Those skilled in the art may employ the process of FIG. 12 and interactions illustrated by FIG. 13 with relevant modifications to the GAA during the WI 414 is turned off for power saving.

Figure 14:
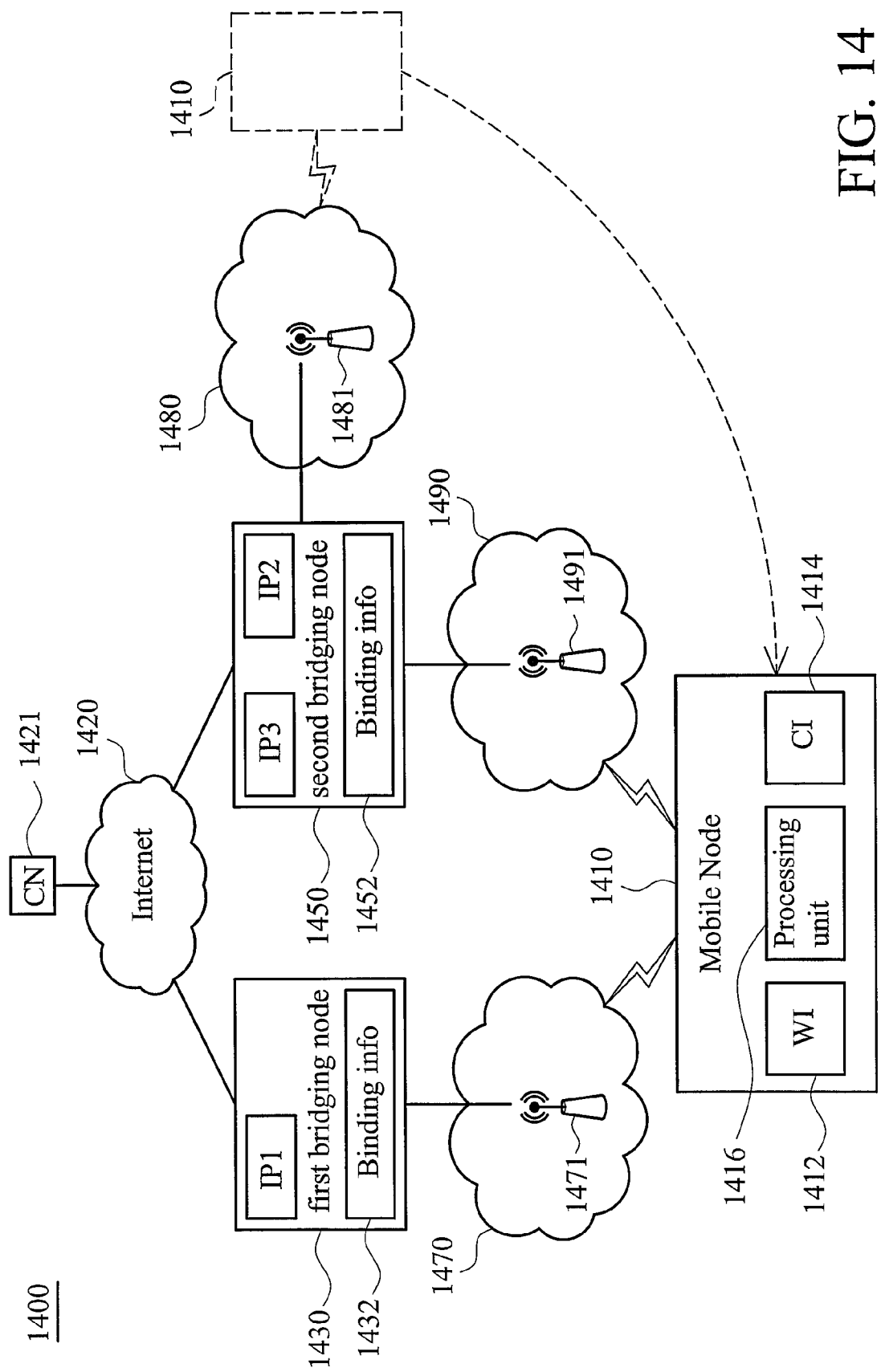
FIG. 14 shows a Mobile IP communication system according to an embodiment of the invention.
Figure 15A:
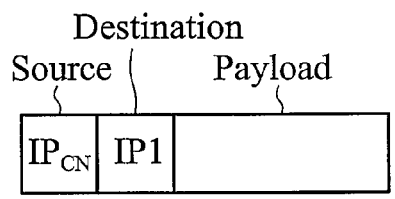
FIGS. 15A-15D are schematic diagrams illustrating tunneling and de-tunneling IP packet for use in the embodiment of FIG. 14.
Figure 15B:
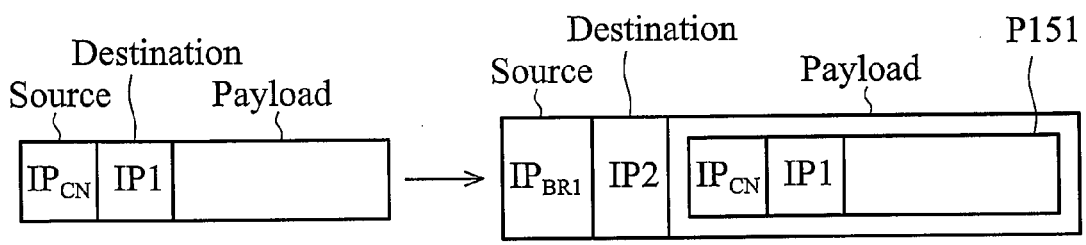
Figure 15C:
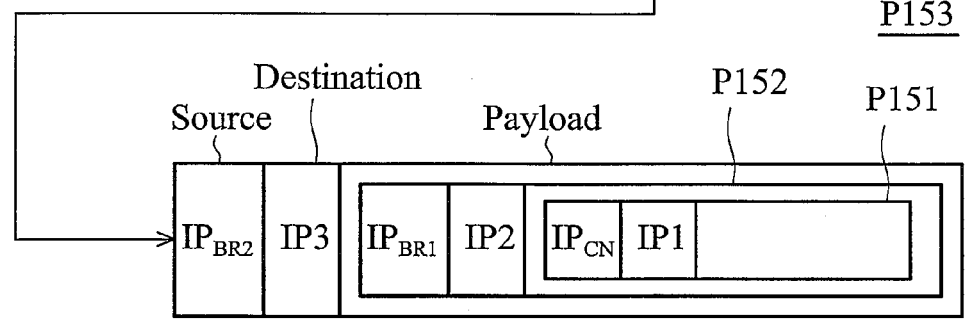
Figure 15D:
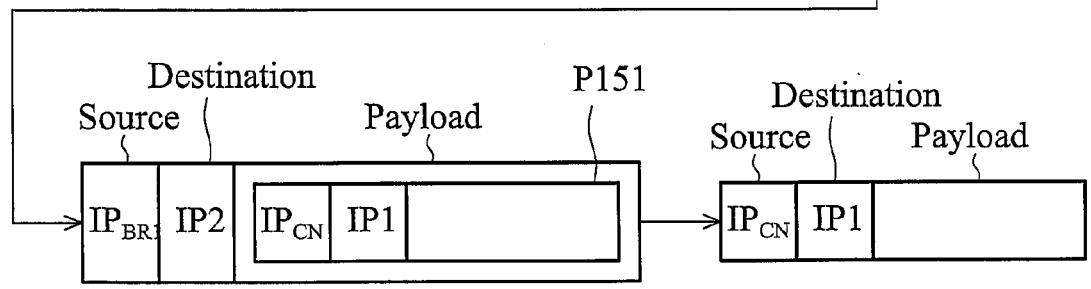

Embodiments for mobile IP Communication System
with Home of Address (HoA) Tunneling Mechanism FIG. 14 shows a Mobile IP communication system 1400 according to an embodiment of the invention, containing an Internet 1420. An AN 1470 may be, for example, Wi-Fi, or the like. The ANs 1490 may be, for example, a General Packet Radio Service (GPRS), or the like. An MN 1410 is equipped with a WI 1412 and a CI 1414 for communicating with a CN 1421 through the Internet 1420. In the mobile IP communication system 1400, each interface, such as the WI 1412 or the CI 1414, is configured with a home of address (HoA), and is associated with a care-of address (CoA) when the MN 1410 moves to a visiting network. Furthermore, each interface of the MN has its own home agent (HA) that maintains the binding between the HoA and the CoA. A first bridging node 1430, such as a first HA (HA1), is coupled between the AN 1470 and the Internet 1420. A second bridging node 1450, such as a second HA (HA2), is coupled between the AN 1480 and the Internet 1420, in addition, between the AN 1490 and the Internet 1420.

For communicating with the CN 1421 through the Internet 1420 and the AN 1470, the MN 1410 performs authentication and authorization operations with the first bridging node 1430, and after authenticated and authorized, acquires a first IP address (HoA1, IP1) from the first bridging node 1430. When receiving packets containing a destination of the first IP address and a source of the CN 1421, the bridging node 1430 forwards the received packets to the AN 1470, so as to a BS 1471 forwards the packets to the MN 1410 through the CI 1412. The MN 1410 may also transmit packets containing a source of the first IP address and a destination corresponding to the CN 1421 to the first bridging node 1470 through the CI 1412 and the AN 1470, so as to the first bridging node 130 routes the packets to the CN 1421 through the Internet 1420. In addition, for communicating with the CN 1421 through the Internet 1420 and AN 1480, the MN 1410 performs authentication and authorization operations with the second bridging node 1450, and after authenticated and authorized, acquires a second IP address (HoA2, IP2) from the second bridging node 1450. Details of packet exchange between the CN 1421 and MN 1410 through the Internet 1420 and AN 1480 comprising an AP may be deduced by the analogy. After roaming into an area out of the coverage of the AN 1480 and covered by the AN 1490, for communicating with the CN 1421 through the Internet 1420 and AN 1490, the MN 1410 acquires a third IP address (IP3) from a foreign agent (FA, not shown) corresponding to the AN 1490. After that, the FA advertises the third IP address to direct the HA2 to create/update and cache binding information 1452 indicating a binding of the second IP address (IP2) to the third IP address (IP3), that is, the third IP address being the CoA2 of HoA2. When receiving packets containing a destination of the second IP address and a source of the CN 1421, the second bridging node 1450 detects the cached binding information 1452, tunnels the received packets with new packet headers each containing a destination of the third IP address, and routes the tunneled packets to the AN 1490, so as to the AN 1490 to forward the tunneled packets to the MN 1410 through the WI 1414.

When associating with the ANs 1470 and 1490 as described above, to minimize the power consumption, the MN 1410 may select only the CI 1414 as awake interface. The selection of the awake interface may be based on user preference, received signal strength or power consumption of the CI interfaces 1414 and WI interface 1412, or others. The MN 1410 directs the first bridging node 1430 to create/update and cache binding information 1432 indicating a binding of the first IP address (HoA1, IP1) to the second IP addresses (HoA2, IP2) using a binding update procedure, that is, the second IP address (IP2) being the CoA1 of HoA1. Such binding update mechanism is called HoA tunneling. After the binding information 1432 is successfully created/update and cached, the MN 1410 turns the WI 1412 off. When receiving packets containing a destination of the first IP address from the CN 1421 (as shown in P151 of FIG. 15A), the first bridging node 1430 also detects the cached binding information 1432, tunnels the received packets with new packet headers each containing a destination of the second IP address (as shown in P152 of FIG. 15B), and routes the tunneled packets to the second bridging node 1450. When receiving packets containing a destination of the second IP address and a source of the CN 1421, the bridging node 1450 detects the cached binding information 1452, tunnels the received packets with new packet headers each containing a destination of the third IP address (as shown in P153 of FIG. 15C), and routes the tunneled packets to the AN 1490, so as to a BS of the AN 1490 to forward the tunneled packets to the MN 1410 through the CI 1414.

Figure 16A:
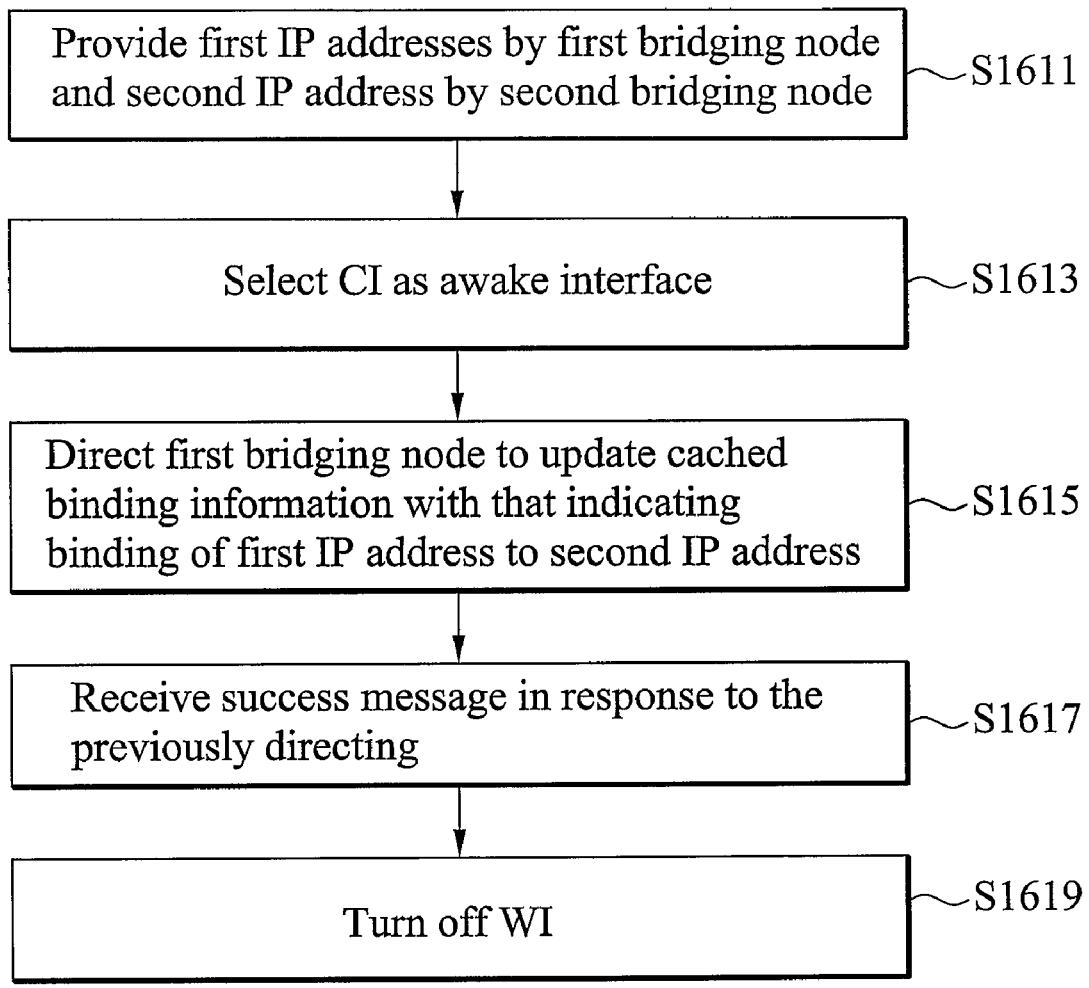
FIG. 16A is a flowchart of a method for turning the WI off to reduce power consumption, performed by the processing unit of the MN, according to an embodiment of the invention.

An embodiment of a method for turning the WI 414 off to reduce power consumption, performed by the processing unit 1416 of the MN 1410, is shown in FIG. 16A. A first IP addresses assigned by the first bridging node 1430 and a second IP address assigned by the second bridging node 1450 are provided (step S1611). The CI 1414 is selected as an awake interface (step S1613). The first bridging node 1430 is directed to create/update the binding information 1432 with that indicating a binding of the first IP address to the second IP address using a binding update procedure (step S1615). In the binding update procedure, the processing unit 116 may issue a message or command for asking the first bridging node 1430 to update the cached binding information 1432. The WI 1412 is turned off (step S1617) after receiving a success message in response to the previously directing (step S1619).

Referring to FIG. 14, after receiving and de-tunneling the tunneled packets (as shown in P153, P152 and P151 of FIG. 15D) from the AN 1490 via the CI 1414, the MN 1410 finds out that the received packets are originally transmitted to the MN 1410 via the WI 1412. Assume that the MN 1410 still stays in the AN 1470, the MN 1410 turns the WI 1412 on and directs the first bridging node 1430 to erase the cached binding information 1432 indicating the binding of the first IP address (HoA1, IP1) to the second IP address (HoA2, IP2). After that, when receiving packets containing a destination of the first IP address from the CN 1421, the first bridging node 1430 detects no binding information corresponding to the first IP address, and forwards the received packets to the MN 1410 through the AN 1470 and the WI 1412. In some embodiments, the MN 1410 may want to continue to use the CI 1414 to communicate with the CN 1421 and issue a binding update request to force the CN 1421 to create binding information indicating a binding of the IP1 to the IP2. Thereafter, the CN 1421 will transmit subsequent packets to the CI 1414 of the MN 1410.

Figure 16B:
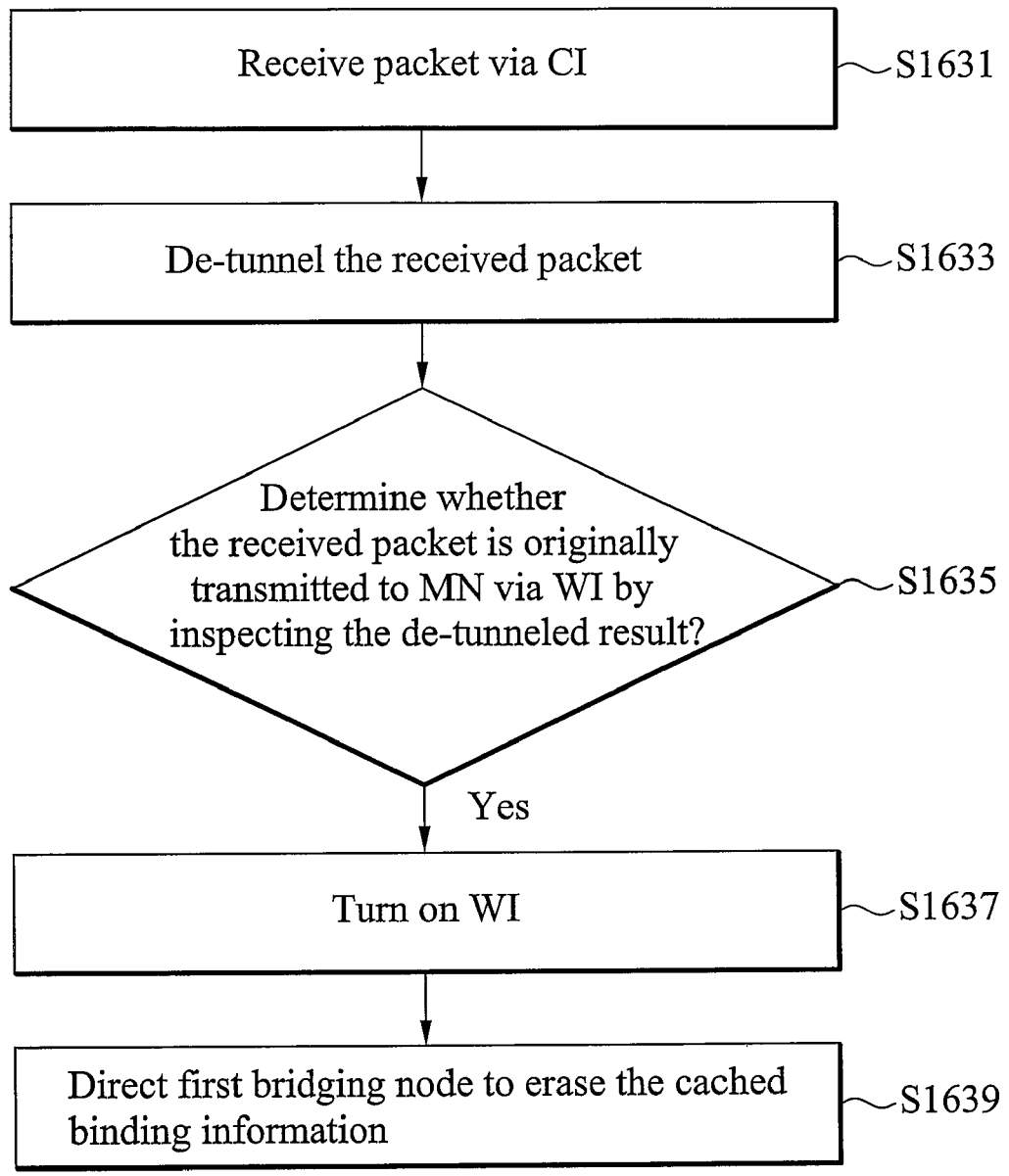
FIG. 16B is a flowchart of a method for turning on the WI to receive consequent packets from the CN, performed by the processing unit of the MN, according to an embodiment of the invention.

An embodiment of a method for turning on the WI 1412 to receive consequent packets from the CN 1421, performed by the processing unit 1416 of the MN 1410, is shown in FIG. 16B. A packet is received via the CI 1414 (step S1631), and the received packet is de-tunneled (step S1633). It is determined whether the received packet is originally transmitted to the MN 1410 via the WI 1412 and the AN 1470 by inspecting the de-tunneled result (step S1635). Specifically, the processing unit 1416 inspects whether the de-tunneled result contains a packet header comprising a destination of the first IP address (as shown in P151 of FIG. 15C or 15D). It is to be understood that, once detecting that a packet received via the CI 1414 is originally transmitted to the MN 1410 via the WI 1412, the processing unit 1416 understands that more packets each comprising a destination of the first IP address are being transmitted or will be transmitted by the CN 1421. If so, WI 1412 is turned on (step S1637), and then, the first bridging node 1430 is directed to erase the cached binding information indicating the binding of the first IP address to the second IP address using the WI 1412 so as to receive consequent packets via the WI 1412 (step S1639).

Figure 17:
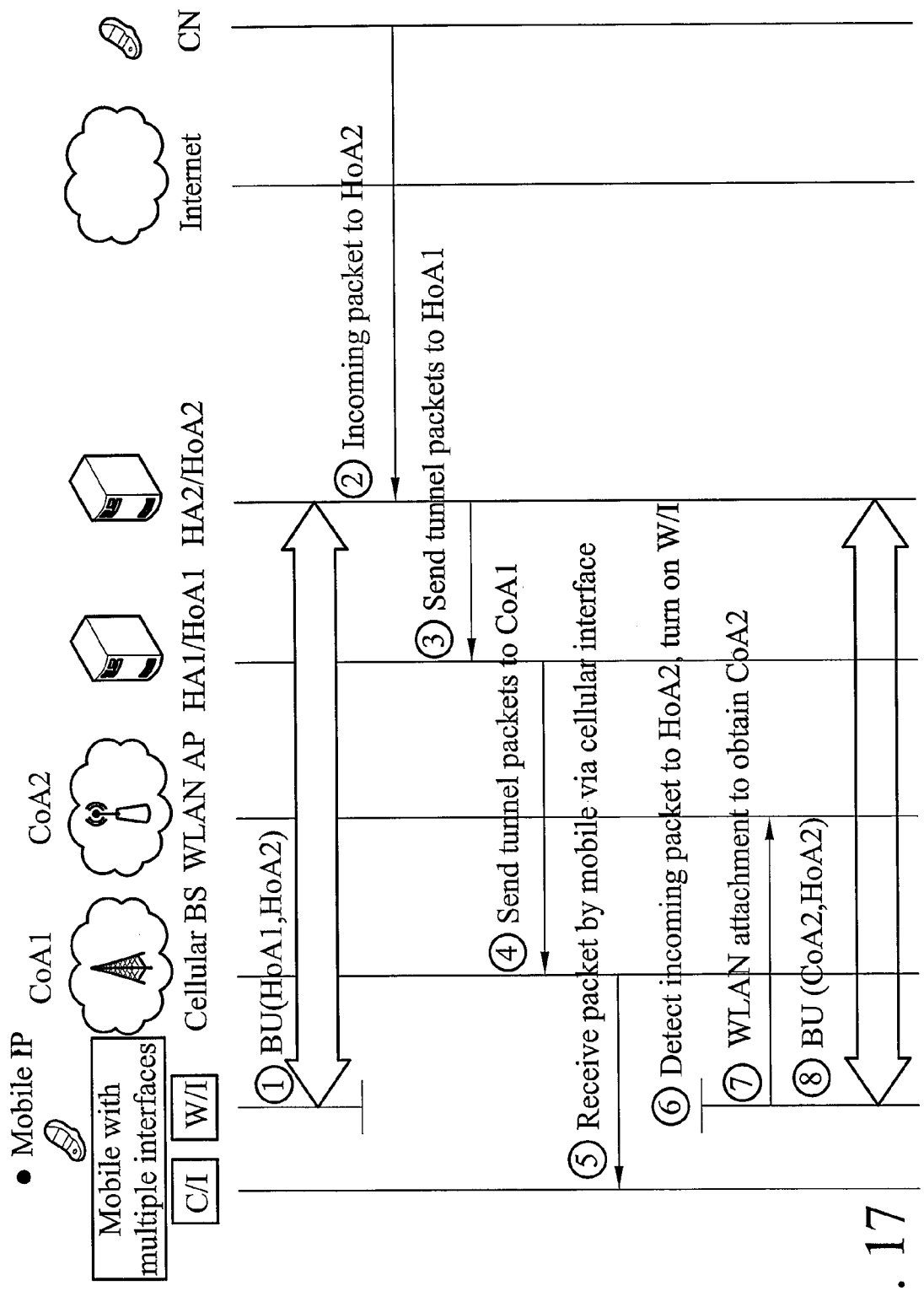
FIG. 17 is a sequence diagram illustrating interactions between stations in the mobile IP communication system with the HoA tunneling mechanism according to an embodiment of the invention.
Figure 18A:
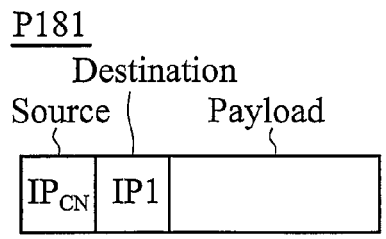
FIGS. 18A-18C are another schematic diagrams illustrating tunneling and de-tunneling IP packet.
Figure 18B:
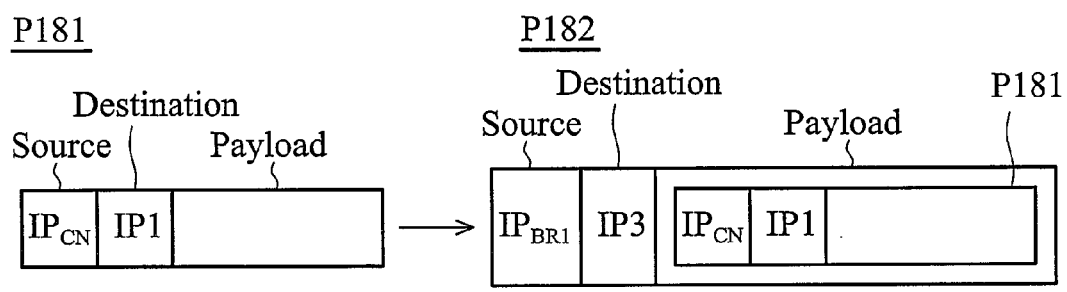
Figure 18C:
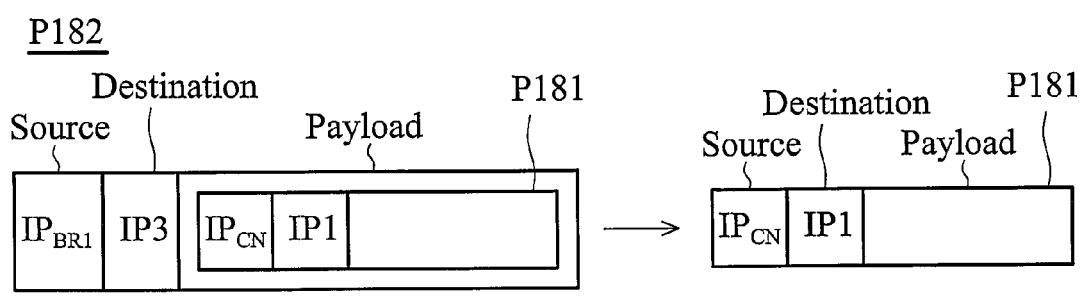

FIG. 17 is a sequence diagram illustrating interactions between stations in the mobile IP communication system with the HoA tunneling mechanism according to an embodiment of the invention. In this embodiment, an MN with a CI for communicating with a cellular network (i.e. an access network) and a WI for communicating with a WLAN (i.e. an access network) are utilized. Initially, the MN activates the CI and WI, and attaches to the cellular network and WLAN via the activated interfaces. The MN acquires a first IP address assigned by a first HA (HA1) as a first HoA (HoA1, IP1) for accessing the Internet through the cellular network and the CI, as well as, acquires a second IP address assigned by a second HA (HA2) as a second HoA (HoA2, IP2) for accessing the Internet through the WLAN and the WI. When the MN roams into an area out of the coverage of the initially associated cellular network and covered by another cellular network, the MN acquires a third IP address assigned by a FA corresponding to the newly discovered cellular network. The FA subsequently advertises the third IP address to direct the HA1 creates/updates and caches binding information indicating a binding of the first IP address to the third IP address, that is, the third IP address being a first CoA (CoA1) of HoA1 (IP3). The MN selects and sets the CI as an awake interface.

As shown in FIG. 17, (1) a binding update procedure is performed to create/update and cache binding information with that indicating a binding of the HoA2 (IP2) to the HoA1 (IP1). After the binding information is created/updated, the WI of the MN is turned off.

(2) When packets each comprising a destination of the HoA2 (IP2) are sent by a CN, the packets are routed to the HA2.

(3) Since detecting the binding information indicating a binding of the HoA2 (IP2) to the HoA1 (IP1), the HA2 tunnels and routes the packets to the HA1.

(4) Since detecting the binding information indicating a binding of the HoA1 (IP1) to the CoA1 (IP3), the HA1 tunnels and routes the packets to the currently associated cellular BS.

(5) The MN receives the packets via the CI.

(6) The MN de-tunnels the received packets and realizes that the tunneled packets are originally sent to the MN through the WI. Then, the MN turns the WI on.

Because the MN may move to another area and lost the link with the original WLAN AP, (7) the MN may perform a series of WLAN attachment, network selection and authentication and authorization procedures to register with a new WLAN AP and to acquire a fourth IP address (IP4) for use in the new WLAN through the WI.

(8) After that, an FA corresponding to the newly registered WLAN AP directs the HA2 to update the cached binding information with that indicating a binding of HoA2 (IP2) to the fourth IP address (CoA2, IP4). Then, the HA2 can route subsequent incoming packets destined to the HoA2 (IP2) to the MN through the WI.

As shown above, after the WI has been turned on, the MN may move to a region out of the coverage of the previously connected WLAN AP. In such situation, the MN has to establish a connection with a new WLAN AP (such as step (7) in FIG. 17), resulting in increased time for reactivating the turned-off interface. Those skilled in the art may also adjust and employ the embodiment of the method (shown in FIG. 12) for periodically listening to the paging to, if necessarily, establish a connection with a new WLAN AP between steps (1) and (6) of FIG. 17.

Moreover, the MN 1410 may select only the WI 1412 as awake interface to minimize the power consumption. Details of the subsequent operations may be deduced by the analogy.

It is to be understood that the first and fourth IP addresses belong to a first IP domain managed by the first bridging node 1430 with a FA if required while the second and third IP addresses belong to a second IP domain managed by the second bridging node 1450 with a FA if required.

Embodiments for Mobile IP Communication System with Care of Address (CoA) Tunneling Mechanism An embodiment of the mobile IP communication system as illustrated in FIG. 14 is provided. The MN 1410 acquires a first IP address (HoA1, IP1) assigned by the first bridging node 1430, in addition, acquires a second IP address (HoA2, IP2) assigned by the second bridging node 1450. After roaming into an area out of the coverage of the AN 1480 and covered by the AN 1490, the MN 1410 acquires a third IP address (IP3) from a foreign agent (FA, not shown) corresponding to the AN 1490. After that, the FA advertises the third IP address (IP3) to direct the HA2 to create/update and cache binding information 1452 indicating a binding of the second IP address (IP2) to the third IP address (IP3), that is, the third IP address being the CoA2 of HoA2.

When associating with the ANs 1470 and 1490 as described above, to minimize the power consumption, the MN 1410 may select only the CI 1414 as awake interface. The selection of the awake interface may be based on user preference, received signal strength or power consumption of the CI interfaces 1414 and WI interface 1412, or others. The MN 1410 directs the first bridging node 1430 to create/update and cache binding information 1432 indicating a binding of the first IP address (HoA1, IP1) to the third IP addresses (CoA2, IP3) using a binding update procedure, that is, the third IP address (IP3) being the CoA1 of HoA1. Such binding update mechanism is called CoA tunneling. After the binding information 1432 is successfully created/update and cached, the MN 1410 turns the WI 1412 off. When receiving packets containing a destination of the first IP address from the CN 1421 (as shown in P181 of FIG. 18A), the first bridging node 1430 also detects the cached binding information 1432, tunnels the received packets with new packet headers each containing a destination of the third IP address (as shown in P182 of FIG. 18B), and routes the tunneled packets to the AN 1490, so as to a BS of the AN 1490 to forward the tunneled packets to the MN 1410 through the CI 1414. It is to be understood that the CoA tunneling mechanism has less tunneling and routing time than that of the HoA tunneling mechanism. However, the MN 1410 consumes more power to activate the WI 1412 and direct the first bridging node 1430 to update binding information 1432 indicating a binding of the first IP address (HoA1, IP1) to a newly acquired IP address (new CoA2 of HoA2, IP3) once the MN 1410 roams into another cellular network.

Those skilled in the art may adjust and employ the described embodiment of the method for turning the WI 1412 off to reduce power consumption in the CoA tunneling mechanism, as shown in FIG. 16A. Step S1611 is devised to further provide a third IP address (IP3) assigned by an FA corresponding to a newly associated cellular network, being a CoA2 of HA2. In addition, step S1613 is devised to direct the first bridging node 1430 to create/update the binding information 1432 with that indicating a binding of the first IP address (IP1) to the third IP address (IP3) using a binding update procedure.

Referring to FIG. 14, after receiving and de-tunneling the tunneled packets (as shown in P182 and P181 of FIG. 18C) from the AN 1490 via the CI 1414, the MN 410 finds out that the received packets are originally transmitted to the MN 1410 via the WI 1412. Assume that the MN 1410 still stays in the AN 1470, the MN 1410 turns the WI 1412 on and directs the first bridging node 1430 to erase the cached binding information 1432 indicating the binding of the first IP address (HoA1, IP1) to the third IP address (CoA2 of HoA2, IP3). After that, when receiving packets containing a destination of the first IP address (IP1) from the CN 1421, the first bridging node 1430 detects no binding information corresponding to the first IP address (IP1), and forwards the received packets to the MN 1410 through the AN 1470 and the WI 1412. In some embodiments, the MN 1410 may want to continue to use the CI 1414 to communicate with the CN 1421 and issue a binding update request to force the CN 1421 to create binding information indicating a binding of the IP1 to the IP2. Thereafter, the CN 1421 will transmit subsequent packets to the CI 1414 of the MN 1410.

Those skilled in the art may adjust and employ the described embodiment of the method for turning on the WI 1412 to receive consequent packets from the CN 1421, as shown in FIG. 16B. Step S1637 is devised to direct the first bridging node 1430 to erase the cached binding information indicating the binding of the first IP address (IP1) to the third IP address (IP3).

Figure 19:
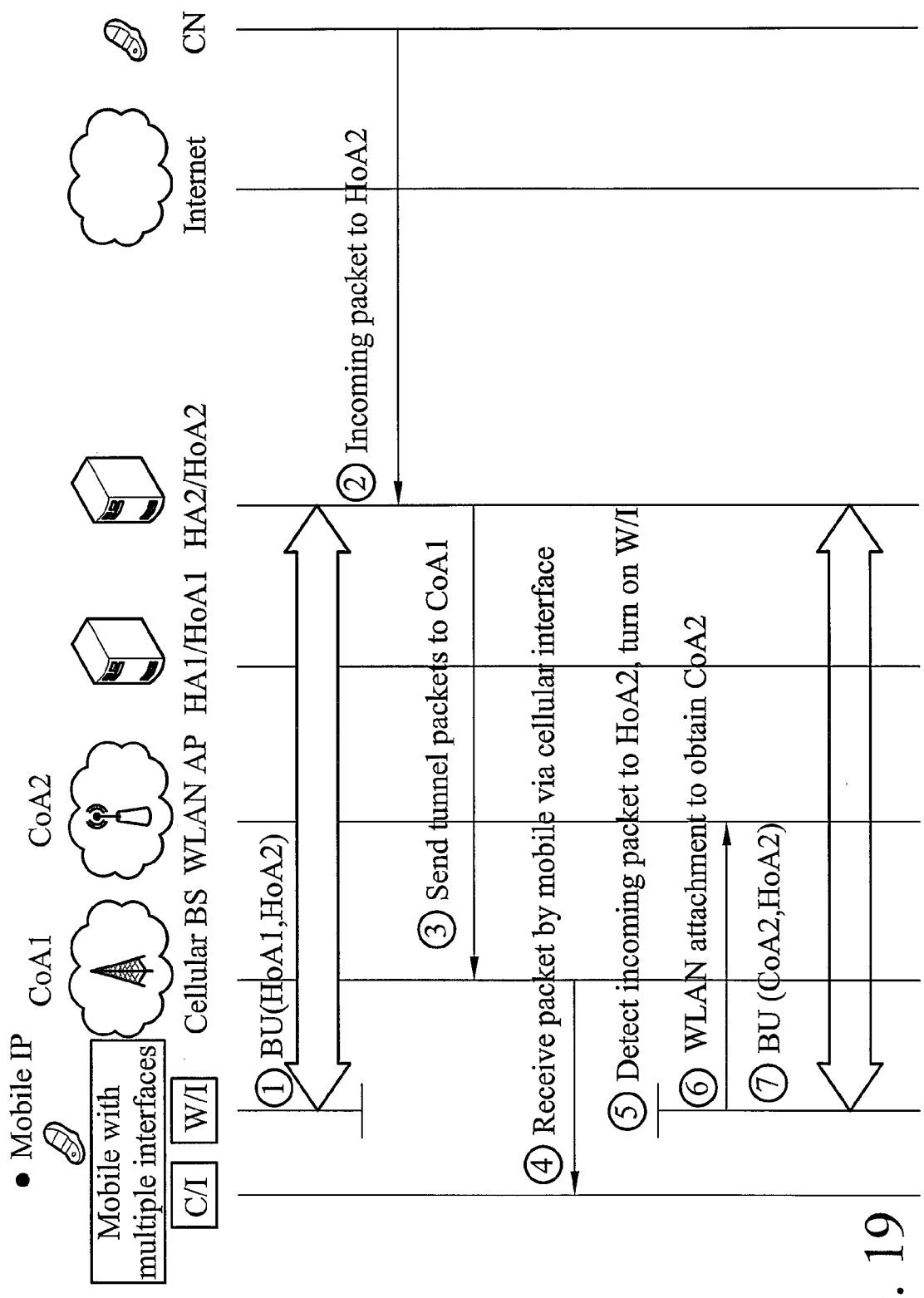
FIG. 19 is a sequence diagram illustrating interactions between stations in the mobile IP communication system with the CoA tunneling mechanism according to an embodiment of the invention.

FIG. 19 is a sequence diagram illustrating interactions between stations in the mobile IP communication system with the CoA tunneling mechanism according to an embodiment of the invention. In this embodiment, an MN with a CI for communicating with a cellular network (i.e. an access network) and a WI for communicating with a WLAN (i.e. an access network) are utilized. Initially, the MN activates the CI and WI, and attaches to the cellular network and WLAN via the activated interfaces. The MN acquires a first IP address assigned by a first HA (HA1) as a first HoA (HoA1, IP1) for accessing the Internet through the cellular network and the CI, as well as, acquires a second IP address assigned by a second HA (HA2) as a second HoA (HoA2, IP2) for accessing the Internet through the WLAN and the WI. When the MN roams into an area out of the coverage of the initially associated cellular network and covered by another cellular network, the MN acquires a third IP address assigned by a FA corresponding to the newly discovered cellular network. The FA subsequently advertises the third IP address (IP3) to direct the HA1 creates/updates and caches binding information indicating a binding of the first IP address (IP1) to the third IP address (IP3), that is, the third IP address being a first CoA (CoA1) of HoA1. The MN selects and sets the CI as an awake interface.

FIG. 19 is similar with FIG. 17 except for step (3). In step (3), since detecting the binding information indicating a binding of the HoA2 (IP2) to the CoA1 (IP3), the HA2 directly tunnels and routes the packets to the currently associated cellular BS, avoiding necessary re-tunneling illustrated in steps (3) and (4) of FIG. 17.

As shown above, after the WI has been turned on, the MN may move to a region out of the coverage of the previously connected WLAN AP. In such situation, the MN has to establish a connection with a new WLAN AP (such as step (6) in FIG. 19), resulting in increased time for reactivating the turned-off interface. Those skilled in the art may also adjust and employ the embodiment of the method (shown in FIG. 12) for periodically listening to the paging to, if necessarily, establish a connection with a new WLAN AP between steps (1) and (5) of FIG. 19.

The described embodiments for the communication method, or certain aspects or portions thereof, may be practiced in logic circuits, or may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a digital camera, a mobile phone, or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor, the program codes combine with the processor to provide a unique apparatus that operate analogously to specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A method for controlling a first interface and a second interface installed on a mobile node, wherein the mobile node communicates with a first access network (AN) through the first interface and communicates with a second AN through the second interface, comprising:

acquiring a first IP address through the first interface and the first AN for accessing a service network (SN);

acquiring a second IP address through the second interface and the second AN for accessing the SN;

selecting the first interface as an awake interface;

directing a second bridging node to create and cache binding information indicating a binding of the second IP address to the first IP address;

turning off the second interface after the binding information is successfully created and cached on the second bridging node;

receiving a packet via the first interface;

de-tunneling the received packet and discovering that the received packet is originally transmitted to the second interface;

turning on the second interface; and directing the second bridging node to erase the cached binding information via the second interface.

2. The method of claim 1, wherein the second bridging node receives a packet comprising a destination of the second IP address, tunnels the received packet with a new packet header comprising a destination of the first IP address and routes the tunneled packet to a first bridging node after detecting the cached binding information.

3. The method of claim 1, wherein the second bridging node receives a packet comprising a destination of the second IP address, and forwards the received packet to the mobile node through the second AN and the second interface after detecting no cached binding information corresponding to the second IP address.

4. The method of claim 1, further comprising:

periodically determining whether the mobile node is potentially moved out of an available coverage of the second AN according to signals received via the first interface after the binding information is successfully created and cached on the second bridging node and the second interface is turned off; and if so, turning on the second interface, discovering a third AN via the second interface, attaching to the third AN when discovered, and turning off the second interface.

5. The method of claim 4, wherein that the mobile node is potentially moved out of an available coverage of the second AN is determined when a condition is satisfied:

$$D_{MN\text{-}AP}+\beta \times D_{MOVE}>R_{AP},$$

$\beta$ is a weighting value, $R_{AP}$ denotes an available coverage area of the second AN, $D_{MN\text{-}AP}$ denotes a distance between the second AN and the mobile node, and $D_{MOVE}$ denotes a moving distance of the mobile node according to variations of signal strengths received by the first interface.

6. A method for controlling a first interface and a second interface installed on a mobile node, wherein the mobile node communicates with a first access network (AN) through the first interface and communicates with a second AN through the second interface, comprising:

acquiring a first IP address through the first interface and the first AN for accessing a service network (SN);

acquiring a second IP address through the second interface and the second AN for accessing the SN;

selecting the first interface as an awake interface;

directing the second bridging node to create and cache binding information indicating a binding of the second IP address to the first IP address;

turning off the second interface after the binding information is successfully created and cached on the second bridging node;

receiving a packet via the first interface;

de-tunneling the received packet and discovering that the received packet is sent by a corresponding node and originally transmitted to the second interface; and directing the corresponding node to create the cache binding information indicating a binding of the second IP address to the first IP address on the corresponding node.

7. The method of claim 6, wherein, after successfully creating and caching the binding information, the corresponding node transmits a packet comprising a destination of the first IP address to the mobile node via the first interface.

8. A system for managing a first interface capable of communicating with a first access network (AN), and a second interface capable of communicating with a second AN, comprising:

a processing unit acquiring a first IP address assigning by a first bridging node through the first interface and the first AN for accessing a service network (SN), acquiring a second IP address assigned by a second bridging node through the second interface and the second AN, acquiring a third IP address assigned by the first bridging node through the second interface for accessing the SN, selecting the first interface as an awake interface, directing the first bridging node to create and cache binding information indicating a binding between the third IP address and the first IP address, turning off the second interface after the binding information is successfully created and cached on the first bridging node, receiving a packet via the first interface, de-tunneling the received packet and discovering that the received packet is originally transmitted to the third IP address, turning on the second interface, and directing the first bridging node to update the cached binding information with that indicating a binding between the third IP address and the second IP address.

9. The system of claim 8, wherein the SN is a 3G service network, the first interface is a cellular interface, the second interface is a wireless interface and the first bridging node receives a packet comprising a destination of the third IP address for the wireless interface, tunnels the received packet with a new packet header comprising a destination of the first IP address and forwards the tunneled packet to the first AN after detecting the cached binding information, and the first AN forwards the tunneled packet to the first interface.

10. The system of claim 8, wherein the first bridging node receives a packet comprising a destination of the third IP address, tunnels the received packet with a new packet header comprising a destination of the second IP address and routes the tunneled packet to the second bridging node through the Internet after detecting the updated binding information.

11. A system for managing a first interface capable of communicating with a first access network (AN), and a second interface capable of communicating with a second AN, comprising:
a processing unit acquiring a first IP address assigned by a first bridging node through the first interface and the first AN for accessing a service network (SN), acquiring a second IP address assigned by a second bridging node through the second interface and the second AN for accessing the SN, selecting the first interface as an awake interface, directing the second bridging node to create and cache binding information indicating a binding between the second IP address and the first IP address, turning off the second interface after the binding information is successfully created and cached on the second bridging node, receiving a packet via the first interface, de-tunneling the received packet and discovering that the received packet is originally transmitted to the second interface, turning on the second interface, and directing the second bridging node to erase the cached binding information or update the cached binding information with that indicating a binding between the second IP address and a third IP address assigned by a foreign agent (FA) using the second interface.

12. The system of claim 11, wherein the SN is the Internet, the first bridging node operates as a first home agent (HA1) for the first interface, the second bridging node operates as a second home agent for the second interface, the first IP address is a first home of address (HoA1) maintained by the HA1 and the second IP address is a second a second home of address (HoA2) maintained by the HA2, the HA1 further maintains a binding between the first IP address and a third IP address, the third IP address is acquired via the first interface through a currently attached AN and is a first care of address (CoA1) of HoA1, and the HA2 receives a packet comprising a destination of the second IP address, tunnels the received packet with a new packet header comprising a destination of the first IP address and forwards the tunneled packet to the HA1 after detecting the cached binding information thereon, and the HA1 receives a packet comprising a destination of the first IP address, tunnels the received packet with another new packet header comprising a destination of the third IP address and routes the tunneled packet to the first interface.

13. The system of claim 11, wherein the second bridging node receives a packet comprising a destination of the second IP address, tunnels the received packet with a new packet header comprising a destination of the third IP address and routes the tunneled packet to the second interface through the Internet after detecting the updated binding information.

14. The system of claim 11, wherein the second bridging node receives a packet comprising a destination of the second IP address, forwards the received packet to the second interface.

15. The system of claim 11, wherein the SN is the Internet, the first bridging node operates as a first home agent (HA1) for the first interface, the second bridging node operates as a second home agent for the second interface, the first IP address is a first care of address (CoA1) of a first home of address (HoA1) maintained by the HA1, the second IP address is a second home of address (HoA2) maintained by the HA2, and the HA2 receives a packet comprising a destination of the second IP address, tunnels the received packet with a new packet header comprising a destination of the first IP address and routes the tunneled packet to the first interface after detecting the cached binding information thereon.

16. A system for managing a first interface capable of communicating with a first access network (AN), and a second interface capable of communicating with a second AN, comprising:
a processing unit acquiring a first IP address assigned by a first bridging node through the first interface and the first AN for accessing a service network (SN), acquiring a second IP address assigned by a second bridging node through the second interface and the second AN for accessing the SN, selecting the first interface as an awake interface, directing the second bridging node to create and cache binding information indicating a binding between the second IP address and the first IP address, turning off the second interface after the binding information is successfully created and cached on the second bridging node, receiving a packet via the first interface, de-tunneling the received packet and discovering that the received packet is originally transmitted to the second interface, directing the second bridging node to erase the cached binding information or update the cached binding information with that indicating a binding between the second IP address and a third IP address assigned by a foreign agent (FA), and turning on the second interface after the cached binding information is successfully erased or updated,
wherein the SN is the Internet, the first bridging node operates as a first home agent (HA1) for the first interface, the second bridging node operates as a second home agent for the second interface, the first IP address is a first care of address (CoA1) of a first home of address (HoA1) maintained by the HA1, the second IP address is a second a second home of address (HoA2) maintained by the HA2, and the third IP address is acquired via the second interface through a currently attached AN and is a second care of address (CoA2) of HoA2.

17. A method for controlling a first interface and a second interface installed on a mobile node, wherein the mobile node communicates with a first access network (AN) through the first interface and communicates with a second AN through the second interface, comprising:
- turning off the second interface;
- determining whether the mobile node is potentially moved out of an available coverage of the second AN according to signals received via the first interface; and
- if so, turning on the second interface, discovering a third AN via the second interface, attaching to the third AN when discovered, and turning off the second interface, wherein that the mobile node is potentially moved out of an available coverage of the second AN is determined when a condition is satisfied:

$$D_{MN-AP}+\beta \times D_{MOVE}>R_{AP},$$

$\beta$ is a weighting value, $R_{AP}$ denotes an available coverage area of the second AN $D_{MN-AP}$ denotes a distance between the second AN and the mobile node, and $D_{MOVE}$ denotes a moving distance of the mobile node according to variations of signal strengths received by the first interface.

* * * * *